(12) United States Patent
Awoniyi-Oteri et al.

(10) Patent No.: US 11,974,310 B2
(45) Date of Patent: Apr. 30, 2024

(54) BLOCK ACKNOWLEDGEMENT FOR MULTIPLE SPS CONFIGURATIONS

(71) Applicant: QUALCOMM Incorporated, San Diego, CA (US)

(72) Inventors: Olufunmilola Omolade Awoniyi-Oteri, San Diego, CA (US); Jelena Damnjanovic, Del Mar, CA (US); Tao Luo, San Diego, CA (US); Ozcan Ozturk, San Diego, CA (US); Iyab Issam Sakhnini, San Diego, CA (US); Jing Sun, San Diego, CA (US); Xiaoxia Zhang, San Diego, CA (US); Sony Akkarakaran, Poway, CA (US); Junyi Li, Franklin Park, NJ (US); Juan Montojo, San Diego, CA (US); Shanyu Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/201,567

(22) Filed: Mar. 15, 2021

(65) Prior Publication Data
US 2021/0360652 A1 Nov. 18, 2021

Related U.S. Application Data

(60) Provisional application No. 63/023,395, filed on May 12, 2020.

(51) Int. Cl.
*H04W 72/50* (2023.01)
*H04L 1/1607* (2023.01)
*H04L 1/1812* (2023.01)
*H04L 1/1867* (2023.01)
*H04W 24/08* (2009.01)
*H04W 72/1273* (2023.01)

(52) U.S. Cl.
CPC ......... *H04W 72/535* (2023.01); *H04L 1/1621* (2013.01); *H04L 1/1819* (2013.01); *H04L 1/1896* (2013.01); *H04W 24/08* (2013.01); *H04W 72/1273* (2013.01)

(58) Field of Classification Search
CPC ............... H04W 72/535; H04W 24/08; H04W 72/1273; H04L 1/1621; H04L 1/1819; H04L 1/1896; H04L 1/1614; H04L 1/1887; H04L 1/1861; H04L 1/165; H04L 1/1822; H04L 1/1854
See application file for complete search history.

(56) References Cited

U.S. PATENT DOCUMENTS 10,979,200 B2 * 4/2021 Yang ..................... H04L 1/1896
2021/0021383 A1 * 1/2021 Chen ..................... H04L 1/1812
(Continued)

OTHER PUBLICATIONS

International Search Report and Written Opinion—PCT/US2021/022567—ISA/EPO—dated Jun. 29, 2021.
(Continued)

*Primary Examiner* — Mandish K Randhawa
(74) *Attorney, Agent, or Firm* — Patterson + Sheridan, L.L.P.

(57) ABSTRACT

Aspects of the present disclosure relate to wireless communications, and more particularly, to mechanisms for using block acknowledgments to acknowledge SPS occasions from multiple SPS configurations.

20 Claims, 15 Drawing Sheets

(56) References Cited

U.S. PATENT DOCUMENTS

| | | | | |
|---|---|---|---|---|
| 2021/0135946 | A1* | 5/2021 | Babaei | H04L 1/1812 |
| 2021/0243782 | A1* | 8/2021 | Miao | H04W 72/1273 |
| 2022/0007399 | A1* | 1/2022 | Rastegardoost | H04L 1/1896 |
| 2022/0061074 | A1* | 2/2022 | Babaei | H04L 5/0053 |
| 2022/0061076 | A1* | 2/2022 | Ma | H04W 72/1273 |
| 2022/0095337 | A1* | 3/2022 | Wang | H04L 1/1861 |

OTHER PUBLICATIONS

Nokia, et al., "Support for SPS Periodicities Below a Slot," 3GPP Draft, 3GPP TSG RAN WG1 Meeting #97, R1-1906758_HARQ Impact of Short SPS_Final, 3rd Generation Partnership Project (3GPP), Mobile Competence Centre, 650, Route Des Lucioles, F-06921 Sophia-Antipolis Cedex, France, vol. RAN WG1, No. Reno, NV, USA, May 13, 2019-May 17, 2019, May 13, 2019 (May 13, 2019), 8 Pages, XP051728209.

NTT Docomo, Inc: "Discussions on DL SPS Enhancement," 3GPP Draft, 3GPP TSG RAN WG1 #99, R1-1912891, 3rd Generation Partnership Project (3GPP), Mobile Competence Centre, 650, Route Des Lucioles, F-06921, Sophia-Antipolis Cedex, France, vol. RAN WG1, No. Reno, USA; Nov. 18, 2019-Nov. 22, 2019, Nov. 9, 2019 (Nov. 9, 2019), XP051823670, pp. 1-9, Retrieved from the Internet: URL: https://ftp.3gpp.org/tsg_ran/WG1_RL1/TSGR1_99/Docs/R1-1912891.zip R1-1912891.docx [retrieved on Nov. 9, 2019] Sections 2-3, pp. 5-7, pp. 6-7.

Qualcomm Incorporated: "Remaining Design Details for URLLC Downlink Sps," 3GPP Draft, 3GPP TSG-RAN WG1 #98b, R1-1911124, Remaining Design Details For URLLC Downlink SPS, 3rd Generation Partnership Project (3GPP), Mobile Competence Centre, 650, Route Des Lucioles, F-06921, Sophia-Antipolis Cedex, France, vol. RAN WG1, No. Chongqing, China, Oct. 14, 2019-Oct. 20, 2019, Oct. 8, 2019 (Oct. 8, 2019), XP051789900, 4 pages.

Wilus Inc: "Remaining Issues on SPS PDSCH for NR URLLC", 3GPP Draft, 3GPP TSG RAN WG1 #99, R1-1913071, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 9, 2019 (Nov. 9, 2019), XP051823764, 5 pages, Retrieved from the Internet: URL: https://ftp.3gpp.org/tsg_ran/WG1_RL1/TSGR1_99/Docs/R1-1913071.zip R1-1913071_SPS_final.docx [retrieved-on Nov. 9, 2019] pp. 3-4.

* cited by examiner

| PUCCH Format | Length of OFDM Symbols | Number of Bits |
|---|---|---|
| 0 (Short) | 1-2 | <=2 |
| 1 (Long) | 4 to 14 | <=2 |
| 2 (Short) | 1 to 2 | >2 |
| 3 (Long) | 4 to 14 | >2, <N |
| 4 (Long) | 4 to 14 | >N |

HARQ-Feedback Payload for ACK WINDOW 1

| SPS 1_0 | SPS 1_1 | SPS 1_2 | SPS 1_3 | SPS 2_0 | SPS 2_1 |
|---|---|---|---|---|---|
| ACK/NAK | ACK/NAK | ACK/NAK | ACK/NACK | ACK/NAK | ACK/NAK |

HARQ-Feedback Payload for ACK WINDOW 2

| SPS 1_0 | SPS 1_1 | SPS 1_2 | SPS 1_3 | SPS 2_0 | SPS 2_1 |
|---|---|---|---|---|---|
| ACK/NAK | ACK/NAK | ACK/NAK | ACK/NAK | ACK/NAK | |

BLOCK ACKNOWLEDGEMENT FOR MULTIPLE SPS CONFIGURATIONS

CROSS REFERENCE TO RELATED APPLICATION

This Application hereby claims priority under 35 U.S.C. § 119 to U.S. Provisional Patent Application No. 63/023,395, filed on May 12, 2020, the contents of which are incorporated herein in their entirety.

TECHNICAL FIELD

Aspects of the present disclosure relate to wireless communications, and more particularly, to mechanisms for using block acknowledgments to acknowledge SPS occasions from multiple SPS configurations.

INTRODUCTION

Wireless communications systems are widely deployed to provide various telecommunication services such as telephony, video, data, messaging, and broadcasts. Typical wireless communications systems may employ multiple-access technologies capable of supporting communications with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communications system may include a number of base stations, each simultaneously supporting communications for multiple communications devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communications system may include a number of distributed units (DUs) (e.g., edge units (EUs), edge nodes (ENs), radio heads (RHs), smart radio heads (SRHs), transmission reception points (TRPs), etc.) in communications with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

Aspects of the present disclosure relate to wireless communications, and more particularly, to mechanisms for activating semi-static or periodic occasions for uplink or downlink communication.

Certain aspects of the present disclosure provide a method for wireless communications by a UE. The method generally includes receiving multiple semi persistently scheduled (SPS) configurations, each SPS configuration allocating the UE with a set of periodic occasions for physical downlink shared channel (PDSCH) transmissions, monitoring SPS occasions of the SPS configurations, and transmitting one or more block acknowledgments (BAs), each BA providing hybrid automatic repeat request (HARQ) feedback for multiple SPS occasions of one or more of the SPS configurations that occur within an acknowledgment window.

Certain aspects of the present disclosure provide a method for wireless communications by a network entity. The method generally includes transmitting, to a user equipment (UE), multiple semi persistently scheduled (SPS) configurations, each SPS configuration allocating the UE with a set of periodic occasions for physical downlink shared channel (PDSCH) transmissions, transmitting physical downlink shared channels (PDSCHs) in at least some of the SPS occasions of the SPS configurations, and monitoring for one or more block acknowledgments (BAs) from the UE, each BA providing hybrid automatic repeat request (HARQ) feedback for multiple SPS occasions of one or more of the SPS configurations that occur within an acknowledgment window.

Certain aspects of the present disclosure provide a user equipment (UE). The UE generally includes means for receiving multiple semi persistently scheduled (SPS) configurations, each SPS configuration allocating the UE with a set of periodic occasions for physical downlink shared channel (PDSCH) transmissions, means for monitoring SPS occasions of the SPS configurations, and means for transmitting one or more block acknowledgments (BAs), each BA providing hybrid automatic repeat request (HARQ) feedback for multiple SPS occasions of one or more of the SPS configurations that occur within an acknowledgment window.

Certain aspects of the present disclosure provide a network entity. The network entity generally includes means for transmitting, to a user equipment (UE), multiple semi persistently scheduled (SPS) configurations, each SPS configuration allocating the UE with a set of periodic occasions for physical downlink shared channel (PDSCH) transmissions, means for transmitting physical downlink shared channels (PDSCHs) in at least some of the SPS occasions of the SPS configurations, and means for monitoring for one or more block acknowledgments (BAs) from the UE, each BA providing hybrid automatic repeat request (HARQ) feedback for multiple SPS occasions of one or more of the SPS configurations that occur within an acknowledgment window.

Certain aspects of the present disclosure provide a user equipment (UE). The UE generally includes a receiver configured to receive multiple semi persistently scheduled (SPS) configurations, each SPS configuration allocating the UE with a set of periodic occasions for physical downlink shared channel (PDSCH) transmissions, a processing system configured to monitor SPS occasions of the SPS configurations, and a transmitter configured to transmit one or more block acknowledgments (BAs), each BA providing hybrid automatic repeat request (HARQ) feedback for multiple SPS occasions of one or more of the SPS configurations that occur within an acknowledgment window.

Certain aspects of the present disclosure provide a network entity. The network entity generally includes a transmitter configured to transmit, to a user equipment (UE), multiple semi persistently scheduled (SPS) configurations, each SPS configuration allocating the UE with a set of periodic occasions for physical downlink shared channel (PDSCH) transmissions and transmit physical downlink shared channels (PDSCHs) in at least some of the SPS occasions of the SPS configurations, and a processing system configured to monitor for one or more block acknowledgments (BAs) from the UE, each BA providing hybrid automatic repeat request (HARQ) feedback for multiple SPS occasions of one or more of the SPS configurations that occur within an acknowledgment window.

Certain aspects of the present disclosure provide an apparatus for wireless communications by a user equipment (UE). The apparatus generally includes an interface configured to receive multiple semi persistently scheduled (SPS) configurations, each SPS configuration allocating the UE with a set of periodic occasions for physical downlink shared channel (PDSCH) transmissions and a processing system configured to monitor SPS occasions of the SPS configurations and generate one or more block acknowledgments (BAs), each BA providing hybrid automatic repeat request (HARQ) feedback for multiple SPS occasions of one or more of the SPS configurations that occur within an acknowledgment window, wherein the interface is further configured to output the one or more BAs for transmission.

Certain aspects of the present disclosure provide an apparatus for wireless communications by a network entity. The apparatus generally includes an interface configured to output, for transmission to a user equipment (UE), multiple semi persistently scheduled (SPS) configurations, each SPS configuration allocating the UE with a set of periodic occasions for physical downlink shared channel (PDSCH) transmissions and output physical downlink shared channels (PDSCHs), for transmission, in at least some of the SPS occasions of the SPS configurations, and a processing system configured to monitor for one or more block acknowledgments (BAs) from the UE, each BA providing hybrid automatic repeat request (HARQ) feedback for multiple SPS occasions of one or more of the SPS configurations that occur within an acknowledgment window.

Certain aspects of the present disclosure provide a computer-readable medium for wireless communications by a user equipment (UE). The computer-readable medium generally includes instructions executable to receive multiple semi persistently scheduled (SPS) configurations, each SPS configuration allocating the UE with a set of periodic occasions for physical downlink shared channel (PDSCH) transmissions, monitor SPS occasions of the SPS configurations, and transmit one or more block acknowledgments (BAs), each BA providing hybrid automatic repeat request (HARQ) feedback for multiple SPS occasions of one or more of the SPS configurations that occur within an acknowledgment window.

Certain aspects of the present disclosure provide a computer-readable medium for wireless communications by a network entity. The computer-readable medium generally includes instructions executable to transmit, to a user equipment (UE), multiple semi persistently scheduled (SPS) configurations, each SPS configuration allocating the UE with a set of periodic occasions for physical downlink shared channel (PDSCH) transmissions, transmit physical downlink shared channels (PDSCHs) in at least some of the SPS occasions of the SPS configurations, and monitor for one or more block acknowledgments (BAs) from the UE, each BA providing hybrid automatic repeat request (HARQ) feedback for multiple SPS occasions of one or more of the SPS configurations that occur within an acknowledgment window.

Aspects generally include methods, apparatus, systems, computer readable mediums, and processing systems, as substantially described herein with reference to and as illustrated by the accompanying drawings.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
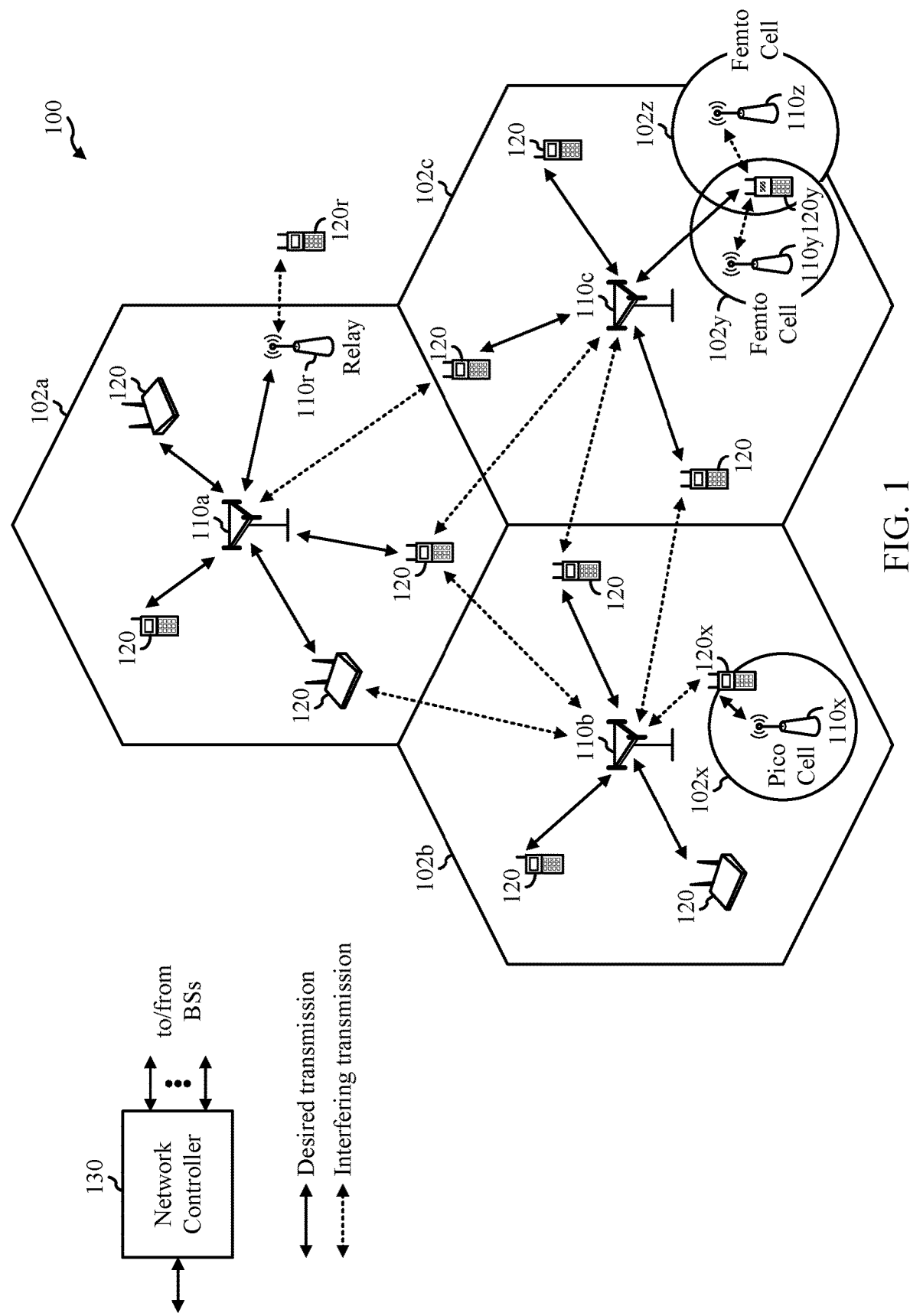
FIG. 1 is a block diagram conceptually illustrating an example telecommunications system, in accordance with certain aspects of the present disclosure.

Aspects of the present disclosure relate to wireless communications, and more particularly, to mechanisms for using block acknowledgments to acknowledge SPS occasions from multiple SPS configurations.

Aspects of the present disclosure provide apparatus, methods, processing systems, and computer readable mediums for new radio (NR) (new radio access technology or 5G technology).

NR may support various wireless communications services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate using beam-formed transmissions. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communications networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communications systems, such as 5G and later, including NR technologies.

Example Wireless System

FIG. 1 illustrates an example wireless network 100 in which aspects of the present disclosure may be performed. For example, one or more UEs 120 of the wireless network 100 may be configured to perform operations 800 of FIG. 8 for block acknowledgment (BA) to provide HARQ feedback of SPS occasions for multiple SPS configurations. Similarly, a base station 110 of the wireless network 100 may be configured to perform operations 900 of FIG. 9 to receive and process such BAs sent by a UE 120 (performing operations 800 of FIG. 8).

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communications coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communications coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communications between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communications. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communications network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
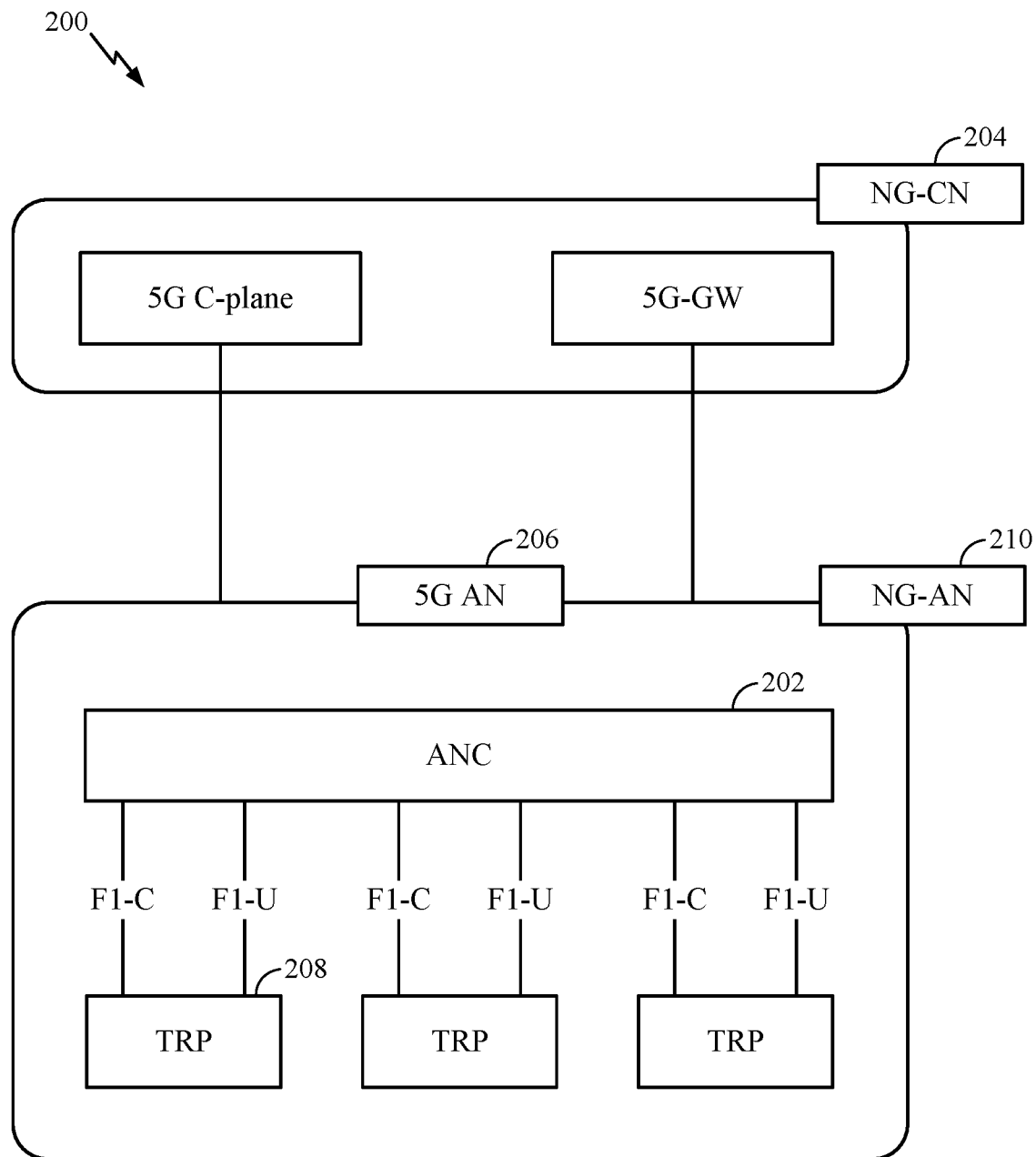
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communications system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
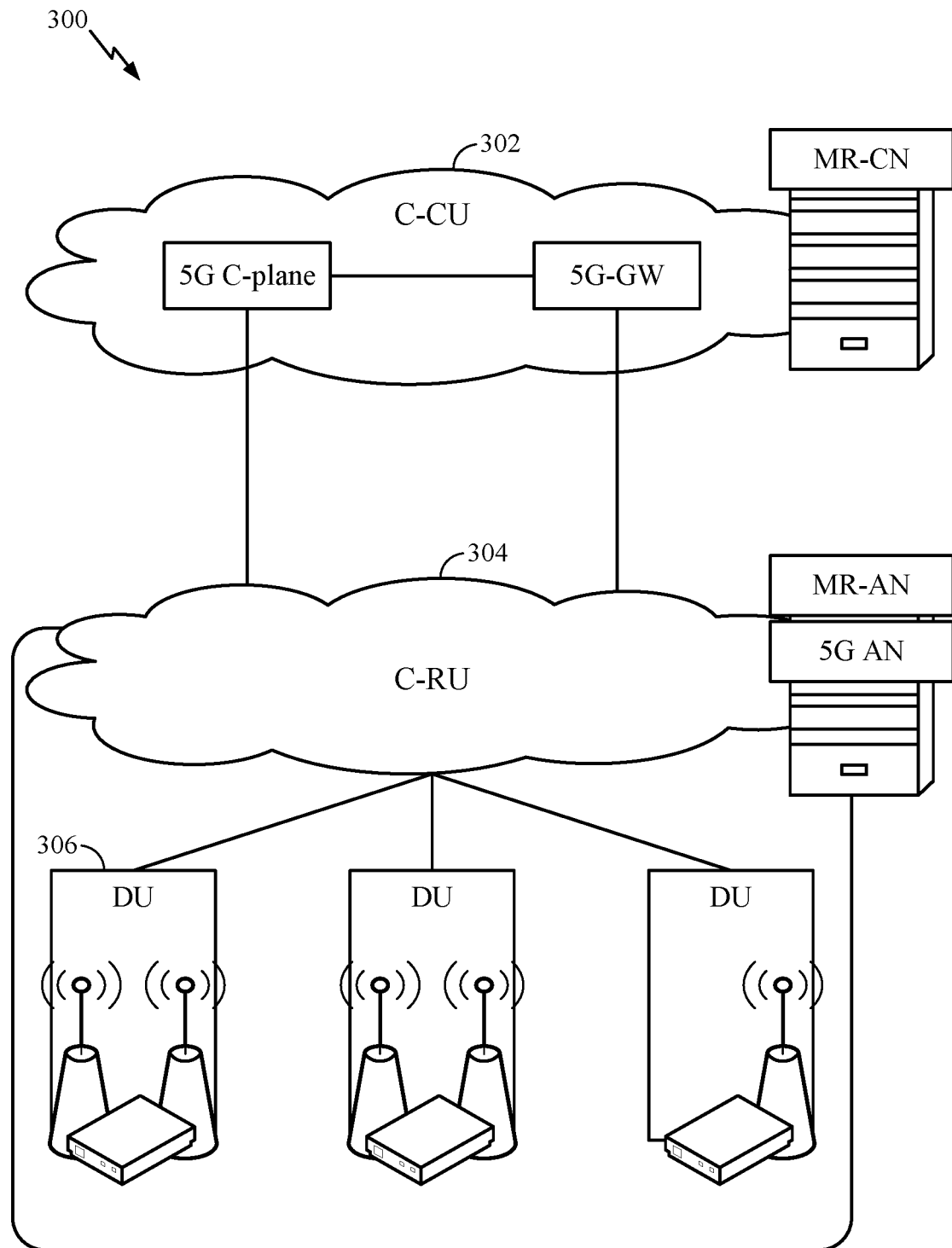
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
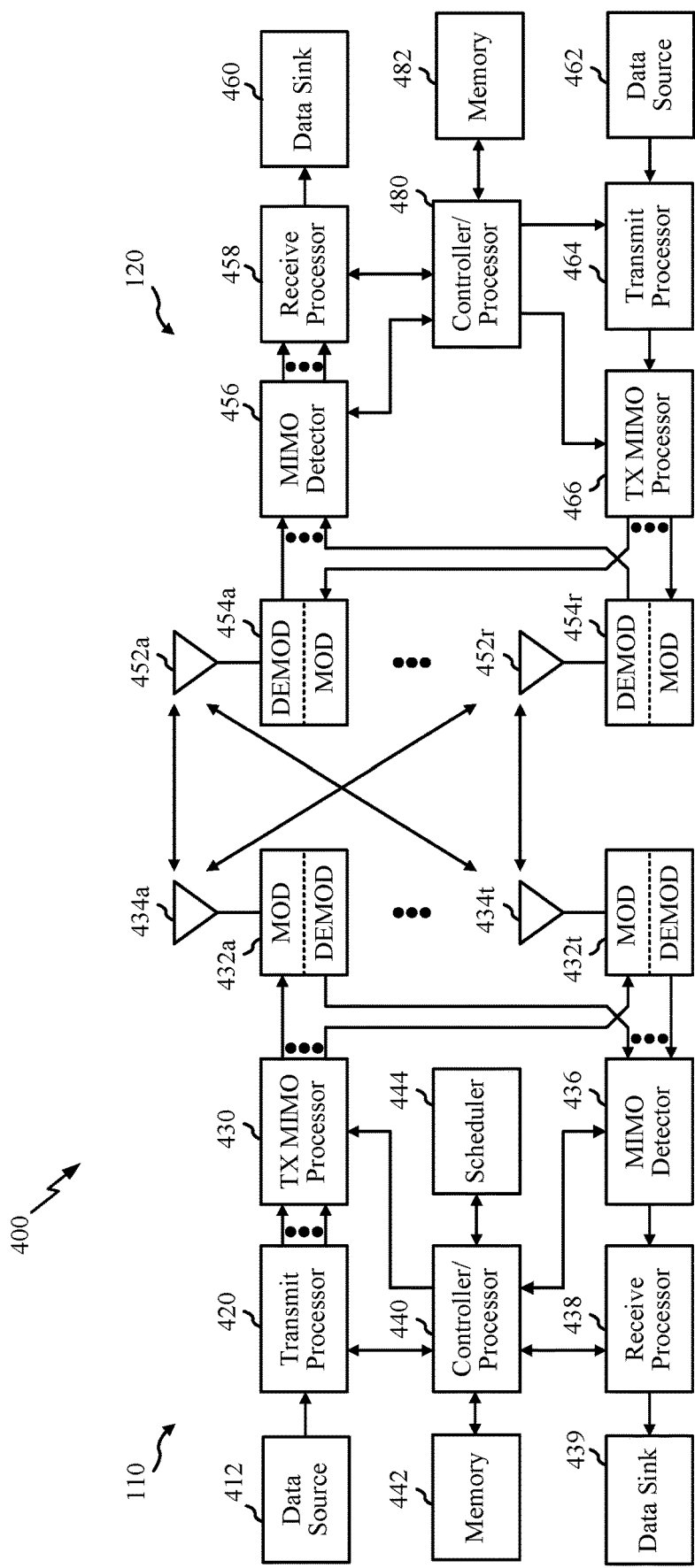
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

Figure 8:
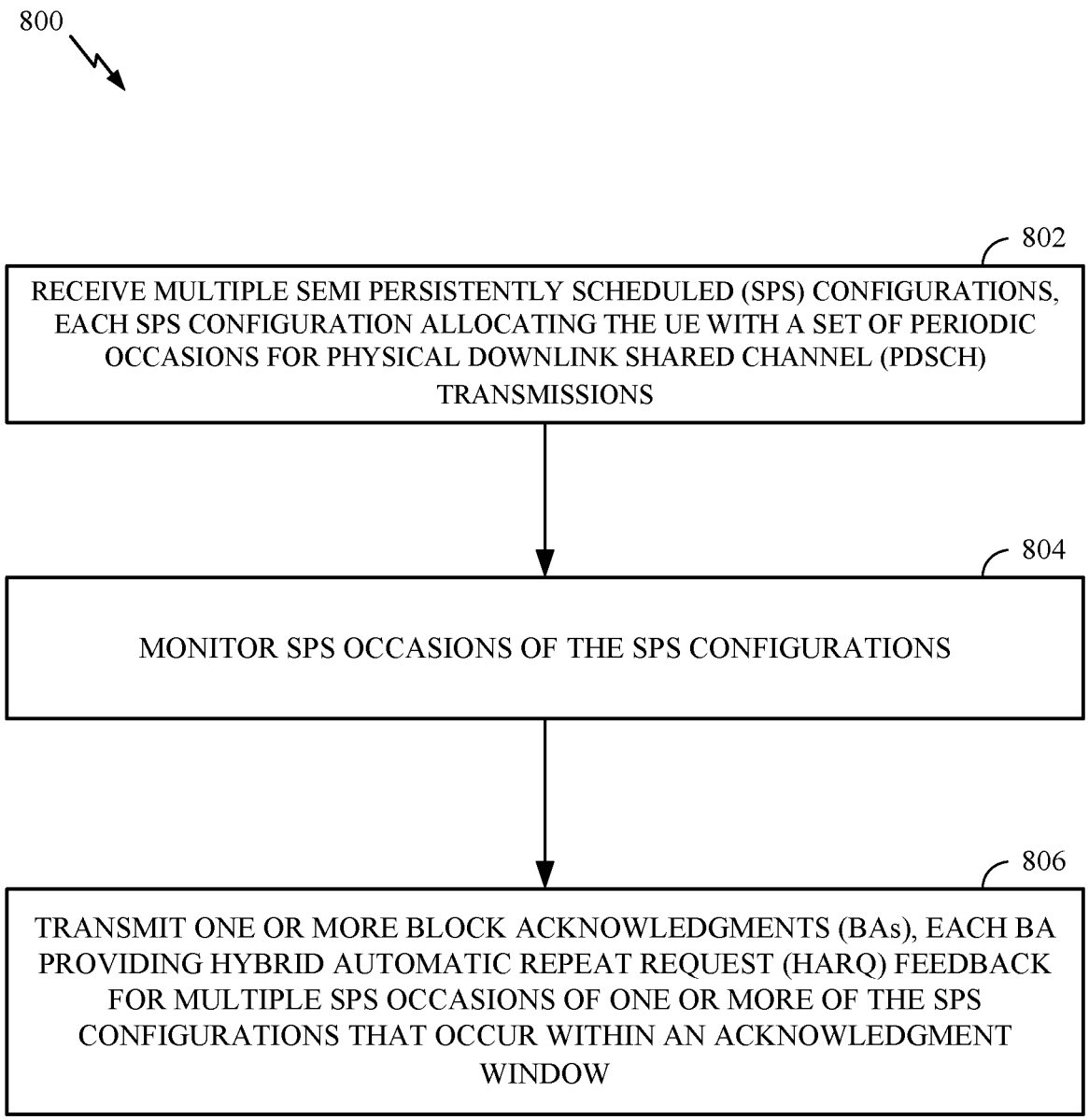
FIG. 8 illustrates example operations that may be performed by a user equipment (UE), in accordance with aspects of the present disclosure.

As an example, one or more of the antennas 452, DEMOD/MOD 454, processors 466, 458, 464, and/or controller/processor 480 of the UE 120 may be configured to perform the operations described herein (e.g., operations 800 of FIG. 8). Similarly, one or more of the 434, DEMOD/MOD 432, processors 430, 420, 438 and/or controller/processor 440 of the BS 110 may be configured to perform the operations described herein (e.g., operations 900 of FIG. 9).

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 8 and/or other processes for the techniques described herein and those illustrated in the appended drawings. The processor 440 and/or other processors and modules at the BS 110 may perform or direct processes for the techniques described with reference to FIG. 9 and/or other processes for the techniques described herein and those illustrated in the appended drawings. The memories 442 and 482 may store data and program codes for the BS 110 and the UE 120, respectively.

Figure 5:
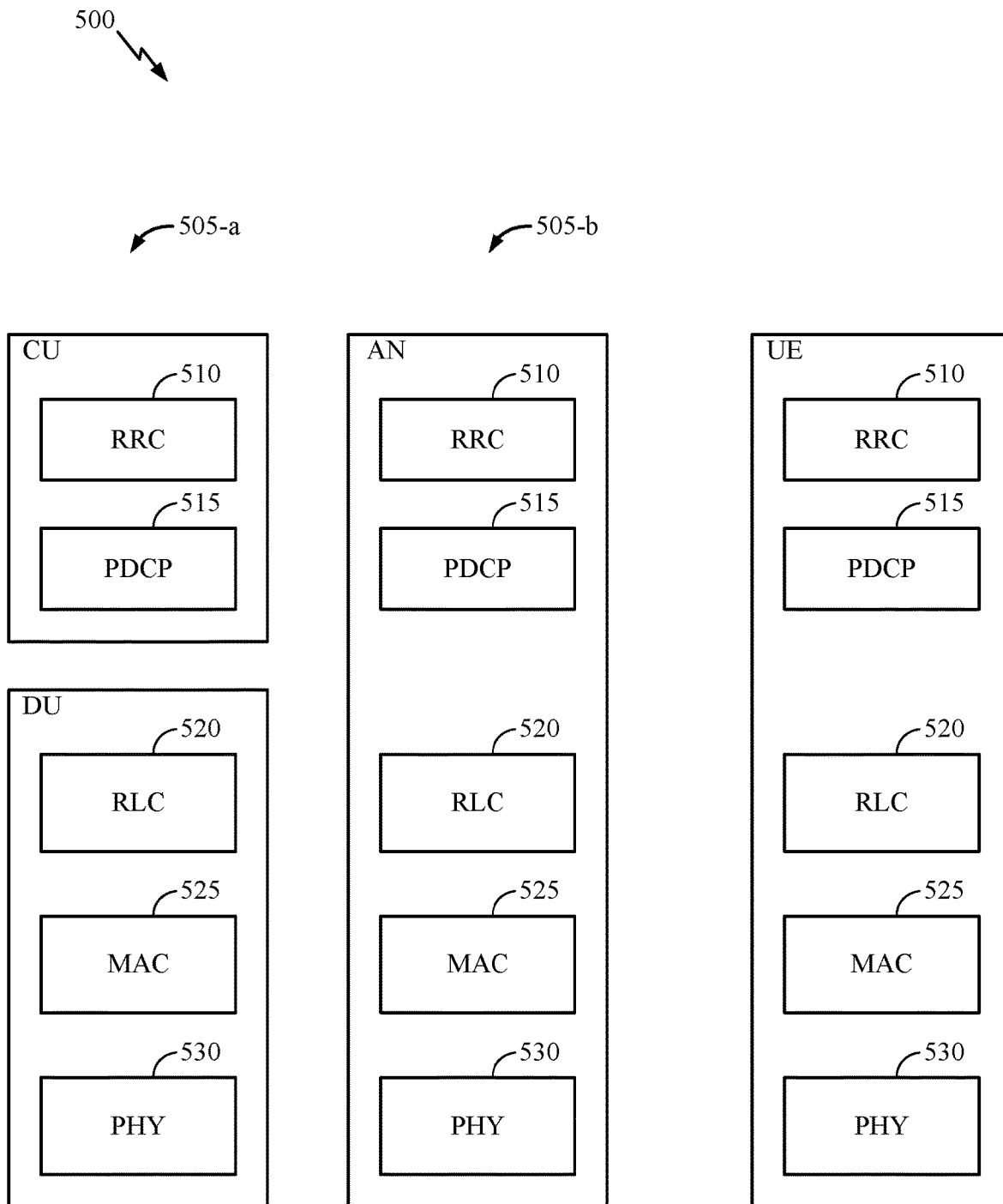
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
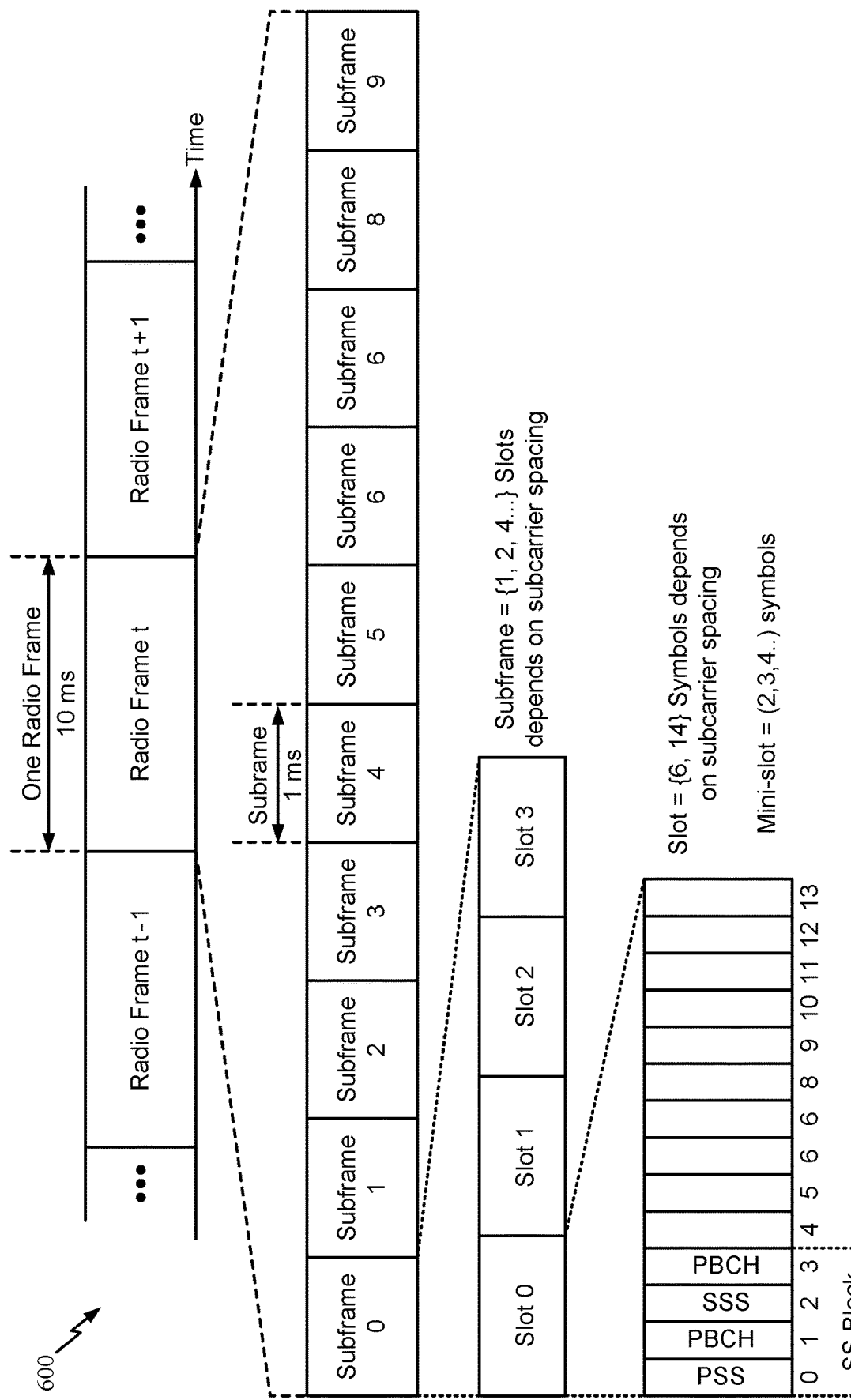
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Block ACK for Multiple SPS Configurations

Aspects of the present disclosure relate to wireless communications, and more particularly, to mechanisms for using block acknowledgments to acknowledge SPS occasions from multiple SPS configurations.

SPS resource allocation, which is sometimes called configured downlink assignment, refers to a scheduling technique where a user-equipment (UE) is pre-configured by the network/base station (e.g., eNBs, gNB, etc.) with a periodicity and an offset.

Figures 7A, 7B:
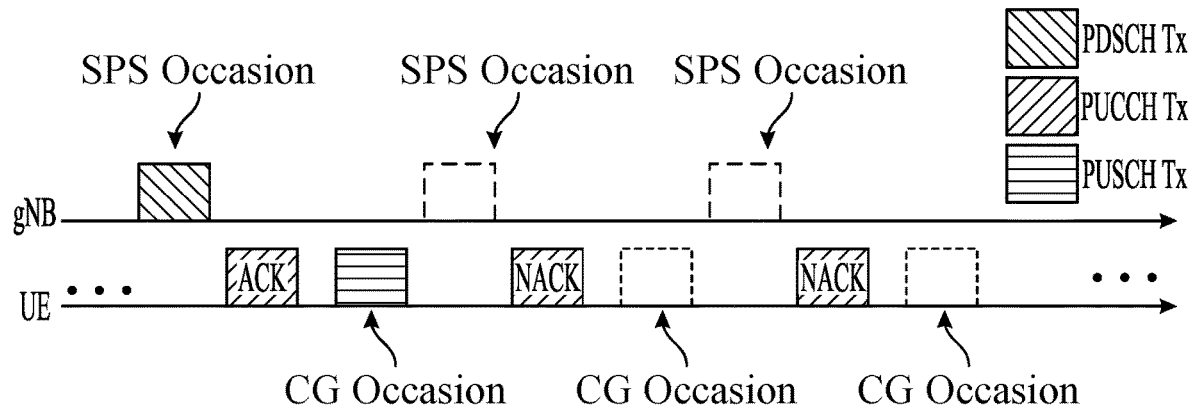
FIG. 7A illustrates an example of semi-persistent scheduled (SPS) PDSCH occasions that may be used to activate configured grant (CG) occasions.
FIG. 7B illustrates example resources for providing SPS acknowledgment feedback.

As illustrated in FIG. 7A, once pre-configured, if the UE were to receive an allocation of downlink resources, then the allocation of SPS occasions would repeat according to the pre-configured periodicity, resulting in periodic SPS occasions. For SPS, the base station may use Radio Resource Control (RRC) signaling to define the periodicity of configured downlink assignments. Similarly, once configured with CG occasions, the allocation of CG occasions may repeat according to the pre-configured periodicity.

As used herein, the term occasion generally refers to a time in which resource are allocated for a transmission that may or may not ultimately happen. For example, a downlink transmission may or may not occur in an SPS occasions. Similarly, an uplink transmission may or may not occur in a CG occasion. Occasions may be considered activated if the transmission may occur and, thus, those occasions should be monitored.

In current systems, CGs are semi-statically activated either by radio resource control (RRC) or downlink control information (DCI) signaling. In some cases, an UL data packet in a CG occasion may be triggered by a decoded DL data packet in an SPS occasion (e.g., to report action status in response to new input/command from DL). This type of activation mechanism, however, may result in a waste of resources.

In some cases, a UE may provide acknowledgment (e.g., hybrid automatic repeat request or HARQ) feedback, indicating whether it received a PDSCH transmission in one or more of the configured SPS occasions. In some systems (e.g., in Rel. 15) an N1-PUCCH-AN may be used to specify preconfigured PUCCH resources to be used for SPS HARQ feedbacks. For example, as illustrated in FIG. 7B, a PUCCH resource using PUCCH formats 0 or 1 can support up to 2 bits of feedback.

In some systems (e.g., in Rel. 16 systems), multiple SPS configurations are allowed. The separate configurations may be performed (e.g., SPS transmissions and monitoring for feedback) by the gNB for each SPS configurations.

One potential challenge in such cases, however, is how or if to share the HARQ process pool among multiple SPS configurations. If the HARQ process pool is shared, a HARQ Process ID offset can be used to avoid overlapping HARQ process between the SPS configurations, according to the following:

HARQ Process ID=[floor (CURRENT_slot/periodicity)] modulo nrofHARQ-Processes+harq-procID-offset;
where CURRENT_slot=[(SFN×numberOfSlotsPerFrame)+slot number in the frame] and numberOfSlotsPerFrame refers to the number of consecutive slots per frame (as specified in TS 38.211 [8]).

As noted above, when the UE receives an SPS PDSCH, ACK/NACK feedback is sent back to the gNB using the assigned PUCCH resource. If each SPS transmission is ACKed/NACKed separately, unnecessary overhead is created in terms of resources. When the UE is configured with multiple SPS configurations, the overheard is even more significant since the PUCCH resources are configured separately.

Providing HARQ feedback for multiple SPS configurations may also have an impact on UE power consumption. For example, the periodic transmission of PUCCH (for SPS HARQ) comes with a power consumption cost at the UE. The per-SPS-occasion HARQ ACK mechanism can lead to unnecessary interference or unnecessary radio resource waste when gNB does not transmit PDSCH at a SPS occasion (e.g., when there is no available data).

Aspects of the present disclosure, however, present mechanisms that may help reduce the overhead due to ACK/NACK feedback when multiple SPS configurations are activated for a UE.

FIG. 8 illustrates example operations 800 for wireless communications by a UE. Operations 800 may be performed, for example, by a UE 120 (e.g., UE 120) participating in communications with a base station that configures the UE with multiple SPS configurations.

Operations 800 begin, at 802, by receiving multiple semi persistently scheduled (SPS) configurations, each SPS configuration allocating the UE with a set of periodic occasions for physical downlink shared channel (PDSCH) transmissions.

At 804, the UE monitors SPS occasions of the SPS configurations. At 806, the UE transmits one or more block acknowledgments (BAs), each BA providing hybrid automatic repeat request (HARQ) feedback for multiple SPS occasions of one or more of the SPS configurations that occur within an acknowledgment window.

Figure 9:
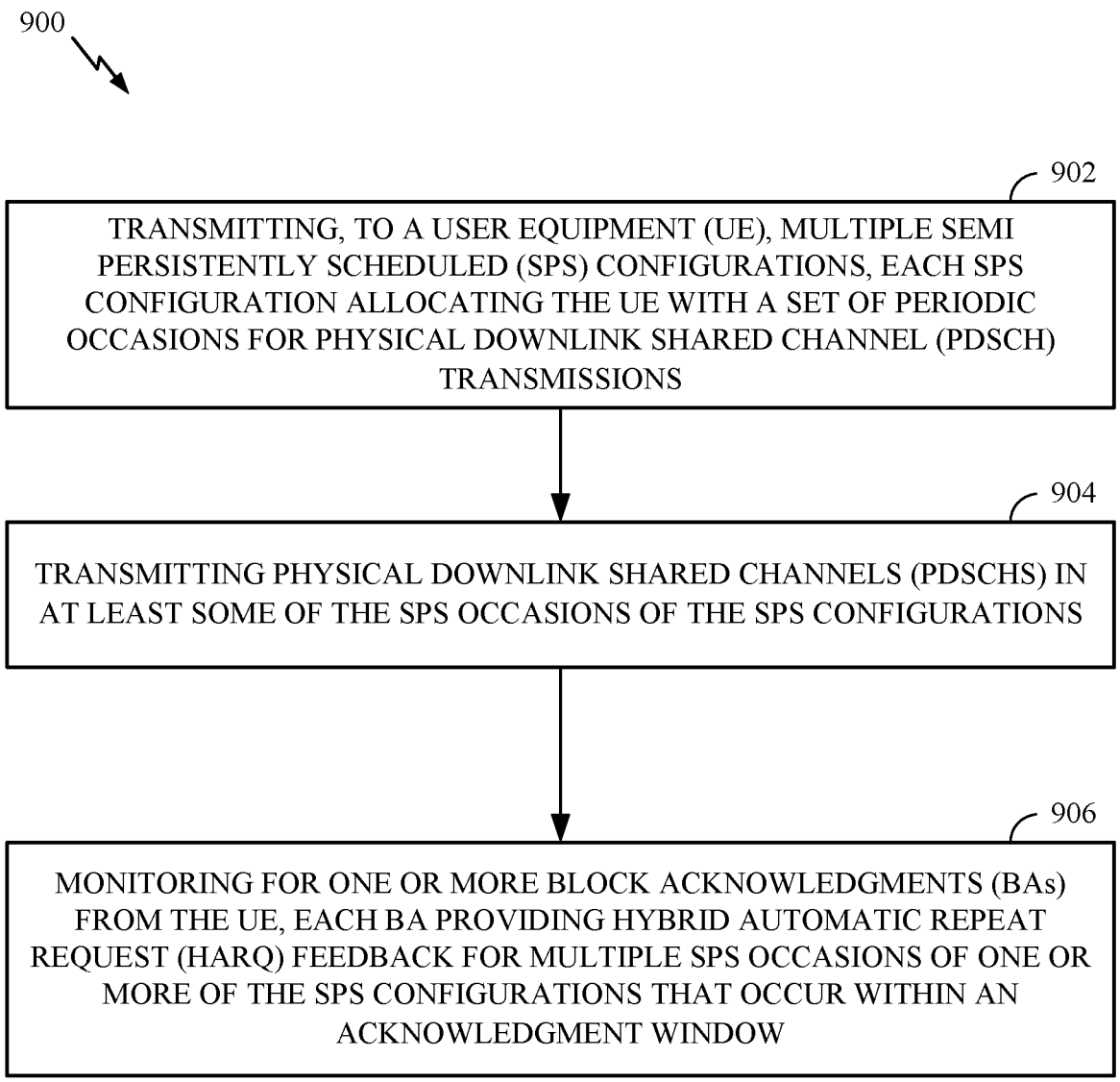
FIG. 9 illustrates example operations that may be performed by a network entity, in accordance with aspects of the present disclosure.

FIG. 9 illustrates example operations 900 that may be performed by a network entity and may be considered complementary to operations 800 of FIG. 8. For example, operations 900 may be performed by a gNB to configure a UE (e.g., a UE performing operations 800 of FIG. 8) with multiple SPS configurations and to monitor for HARQ feedback sent via separate or shared BAs.

Operations 900 begin, at 902, by transmitting, to a user equipment (UE), multiple semi persistently scheduled (SPS) configurations, each SPS configuration allocating the UE with a set of periodic occasions for physical downlink shared channel (PDSCH) transmissions.

At 904, the network entity transmits physical downlink shared channels (PDSCHs) in at least some of the SPS occasions of the SPS configurations. At 906, the network entity monitors for one or more block acknowledgments (BAs) from the UE, each BA providing hybrid automatic repeat request (HARQ) feedback for multiple SPS occasions of one or more of the SPS configurations that occur within an acknowledgment window.

Figure 10:
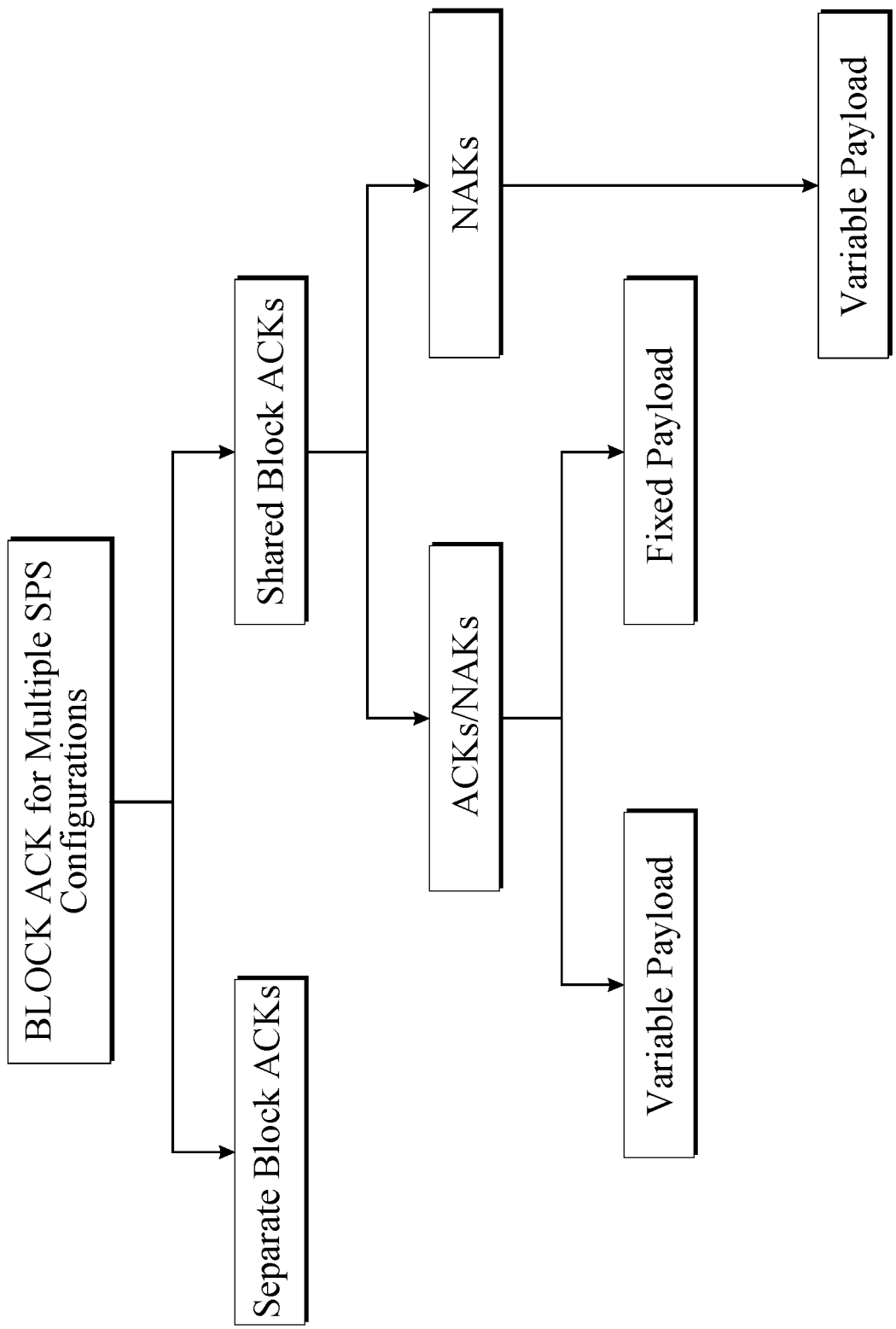
FIG. 10 is a summary of different types of block acknowledgments (BAs) for multiple SPS configurations, in accordance with certain aspects of the present disclosure.

FIG. 10 is a summary of different types of block acknowledgments (BAs) for multiple SPS configurations, in accordance with certain aspects of the present disclosure. As illustrated, the proposal include using separate BAs for multiple SPS configurations or sharing BAs among multiple SPS configurations.

As will be described in greater detail below shared BAs may be used to provide both positive feedback (ACKs, indicating a PDSCH was received in an SPS occasion) and negative (NAKs, indicating a PDSCH was not received in an SPS occasion) may be used or NAKs only (meaning no feedback is sent if a PDSCH was received in an SPS occasion). If ACKs and NAKs are sent as feedback, the feedback payload may be variable or fixed. If NAK only feedback is sent, the feedback payload may also be variable.

Figure 11A:
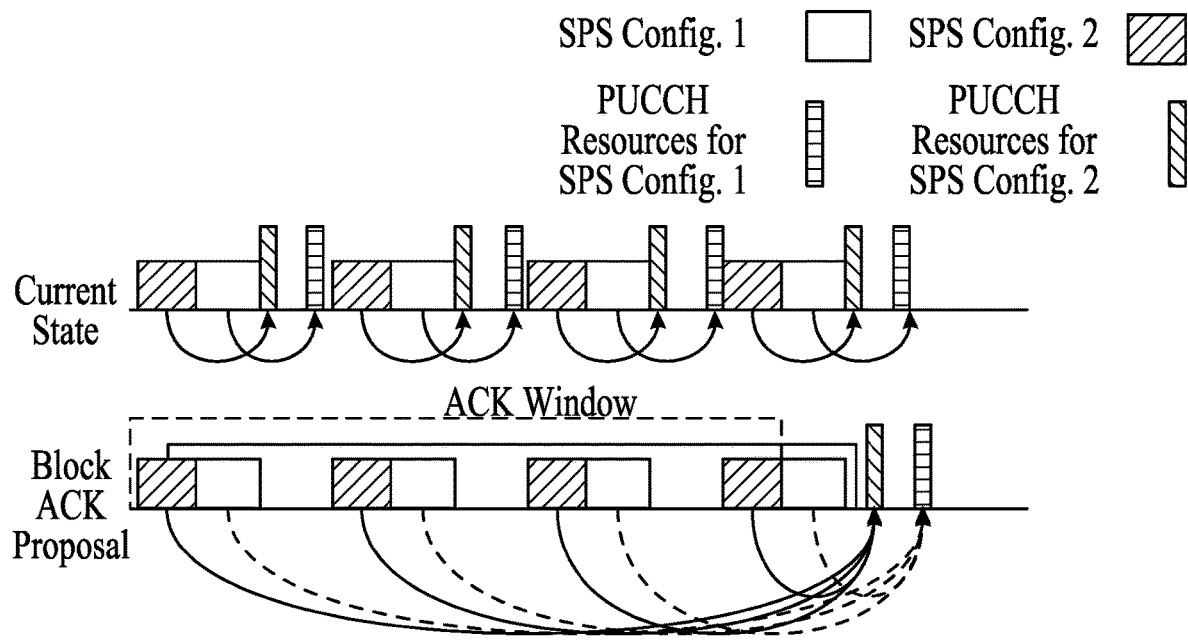
FIG. 11A illustrates an example of separate BAs per SPS configuration, in accordance with aspects of the present disclosure.

FIG. 11A illustrates an example of separate BAs per SPS configuration, in accordance with aspects of the present disclosure. The top timeline in FIG. 11A shows a conventional scenario where ACK feedback is provided for each SPS occasion, resulting in substantial overhead. In contrast, the bottom timeline shows how the UE is able to efficiently acknowledge a set of SPS occasions within an acknowledgment (ACK) window, for each SPS configuration, with a single BA for each.

Figure 11B:
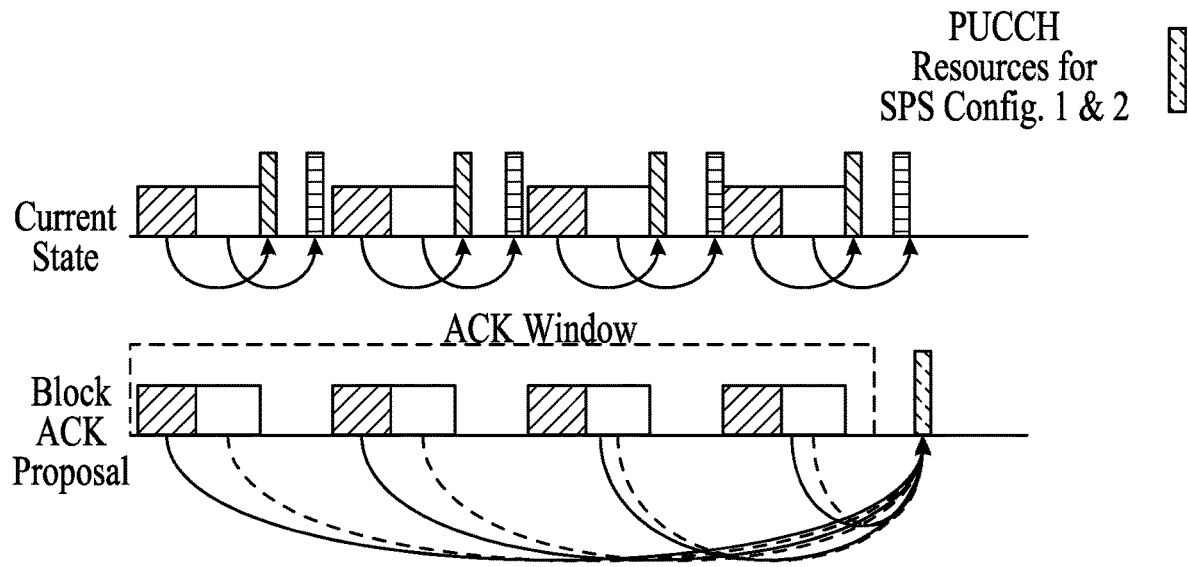
FIG. 11B illustrates an example of a shared BA for multiple SPS configurations, in accordance with aspects of the present disclosure.

FIG. 11B illustrates an example of one (single) BA shared across multiple SPS configurations, in accordance with aspects of the present disclosure. As with FIG. 11A, the top timeline in FIG. 11A shows a conventional scenario where ACK feedback is provided for each SPS occasion, resulting in substantial overhead. In contrast, the bottom timeline shows how the UE is able to efficiently acknowledge sets of SPS occasions within the ACK window, for both SPS configurations, with a single BA. As illustrated, using a shared BA for multiple SPS configurations may be more resource and power efficient, than the conventional case or the separate BA case.

Figures 12A, 12B, 12C:
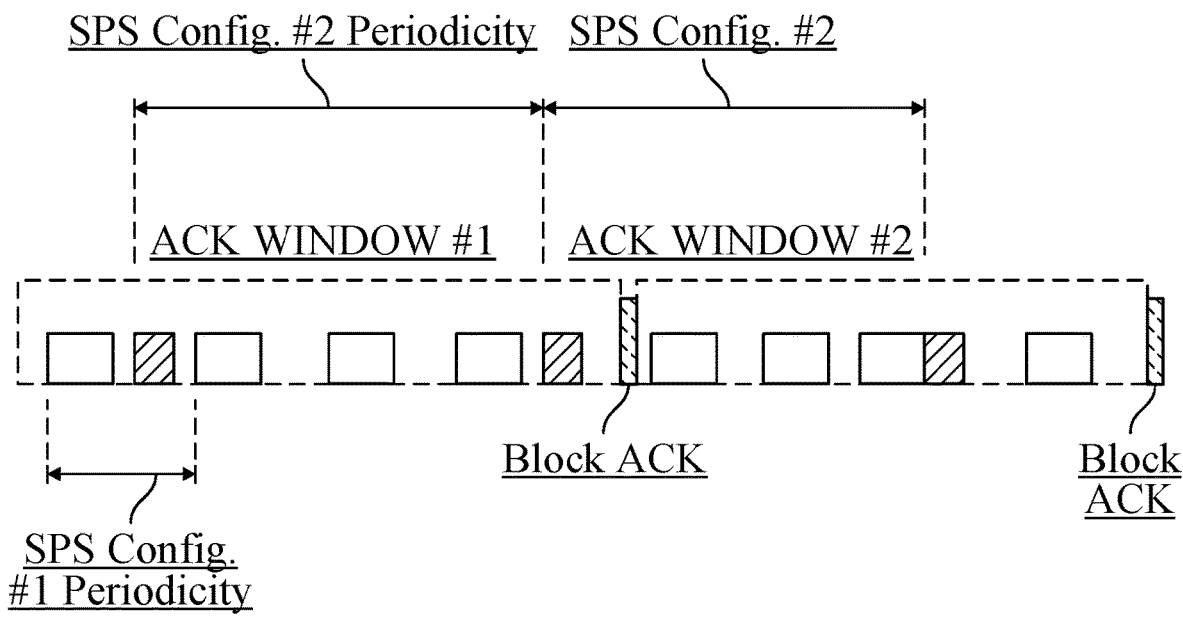
FIG. 12A illustrates an example of a shared BA for multiple SPS configurations, in accordance with aspects of the present disclosure.
FIGS. 12B and 12C illustrate example HARQ feedback payloads, in accordance with aspects of the present disclosure.

FIG. 12A illustrates another example of a shared BA for multiple SPS configurations, in accordance with aspects of the present disclosure. The example, again, assumes two SPS configurations (#1 and #2).

As illustrated, when multiple SPS configurations share the same block ACK, based on the SPS periodicities, the number of occasions for each SPS configuration may vary. In the illustrated example, due to different SPS periodicities, the SPS configuration #1 has 4 SPS occasions within first and second ACK Windows, while SPS configuration #2 has only 2 SPS occasions in the first ACK window and 1 occasion in the second ACK Window.

As illustrated in FIGS. 12B and 12C, in some cases, the HARQ feedback payload may be variable (different across the first and second ACK windows). Variable feedback, in such case, may be efficient since only occasions received within the window are acknowledged.

In some cases, the ACK resources can be assigned for the maximum number of occasions per window. The example shown in FIGS. 12B and 12C, assume a maximum of 6 occasions per window as shown in FIG. 12A (4 for config #1 and 2 for config #2 in ACK window 1). As shown in FIG. 12B, all of the resources may be used for the first ACK window (that has the maximum number of SPS occurrences).

As shown in FIG. 12C, however, since the second ACK window has only 5 SPS occasions, not all of the ACK resources are used. In some cases, unused resources can be left unused. In other cases, however, unused resources can be used to improve the link efficiency of the HARQ-feedback (e.g., by adjusting the MCS).

In some cases, the ordering of the ACK/NAK feedback in a shared BA can be in terms of an SPS configuration number. In the example illustrated in FIGS. 12B and 12C, HARQ for SPS configuration #1 occurs first and then HARQ for SPS configuration #2. As an alternative, the ordering of ACK/NACK feedback could be based on how the SPS occasions occur in time.

Figures 13A, 13B, 13C, 14A, 14B:
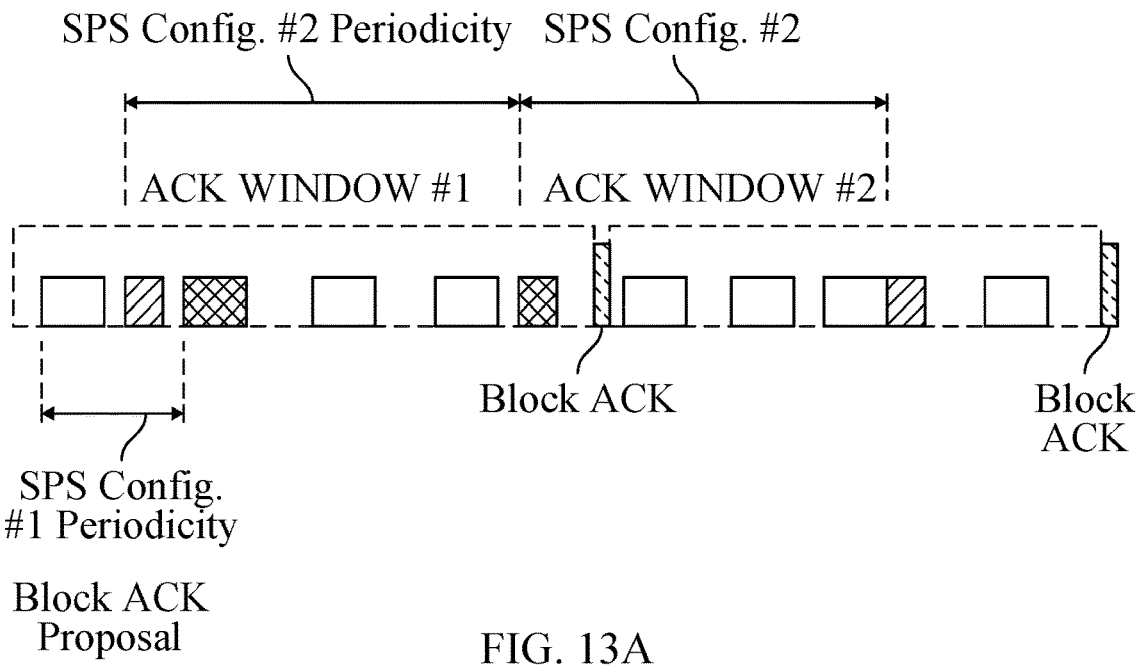
FIG. 13A illustrates an example of a shared BA for multiple SPS configurations, in accordance with aspects of the present disclosure.
FIGS. 13B and 13C illustrate example HARQ feedback payloads, in accordance with aspects of the present disclosure.
FIGS. 14A and 14B illustrate example HARQ feedback payloads, in accordance with aspects of the present disclosure.

FIG. 13A illustrates another example of a shared BA for multiple SPS configurations, in accordance with aspects of the present disclosure. The example, again, assumes two SPS configurations (#1 and #2). Again, due to different SPS periodicities, the SPS configuration #1 has 4 SPS occasions within first and second ACK Windows, while SPS configuration #2 has only 2 SPS occasions in the first ACK window and 1 occasion in the second ACK Window.

In this example, however, the HARQ Feedback (ACK/NAK feedback) may have a fixed payload. In this case, the gNB may assign resources for the maximum number of occasions of all SPS configurations that may fall in the ACK Window. For this example, as shown in FIGS. 13B and 13C, this results in resources for 6 ACK/NAKs. As illustrated in FIG. 13C, if an SPS occasion does not occur in a window, the UE can send a NAK. It may be noted that, in this case, the UE may only need to send the ACK/NAK in the payload, with no need to send the SPS configuration ID and/or the HARQ process ID.

FIGS. 14A and 14B illustrate an example of a variable size payload with NAKs only, assuming the same example SPS configurations shown in FIG. 13A. In this case, with NAKs only, since the gNB network might not be aware of which SPS configuration and HARQ process IDs are being NAKed, the UE may need to include some identifying information in the UCI with the NAK feedback.

The particular information may depend on whether the HARQ process pool is shared or not. A HARQ process pool is considered shared if overlapping HARQ process IDs are allowed among SPS configurations. If the HARQ process pool is not shared, the UE may include the HARQ Process ID and the SPS Configuration # in the payload carrying the NAK feedback for that HARQ process ID. If the HARQ process pool is shared (overlapping HARQ process IDs are not allowed among SPS configurations), it may be sufficient that the UE only includes the HARQ process ID in the payload.

The addition of such identifying information may lead to increased gNB complexity, because of blind decoding of variable payload sizes on the PUCCH. In some cases, the payload sizes maybe quantized (e.g. to 1, 4, 8 feedbacks) to reduce the gNB decoding complexity. In some cases, unique IDs within an ACK window can also be used when transmitting the NAKs only in the Block ACK.

There are various options for configuring the BA mechanisms described herein. For example, the gNB may configure the UE or the UE may request one or more of the following features:
  Shared versus separate Block ACKs;
  A shared HARQ process ID pool;
  A Block ACK to carry NAK only or carry both ACK/NAK; or
  Variable versus a fixed payload HARQ feedback.

In some cases, the gNB may send these configurations along with the SPS configurations via RRC signaling. In such cases the activation/deactivation of the features may be via RRC signaling, MAC, or PHY signaling.

In some cases, for fixed PUCCH Assignment, PUCCH resource reservation for Block ACK might be assigned and configured with the SPS configurations. This may be appropriate, for example, for scenarios with fixed payload HARQ-feedback.

In some cases, to allow more efficient reservation of resources, the network may dynamically assign PUCCH resources (e.g., before each ACK WINDOW). This may be more appropriate, for example, for scenarios with variable payload HARQ feedback (e.g. for the scenario shown in FIGS. 14A and 14B) since the number of NAKs may vary due to conditions such as the interference, channel conditions, and the like.

Figure 15:
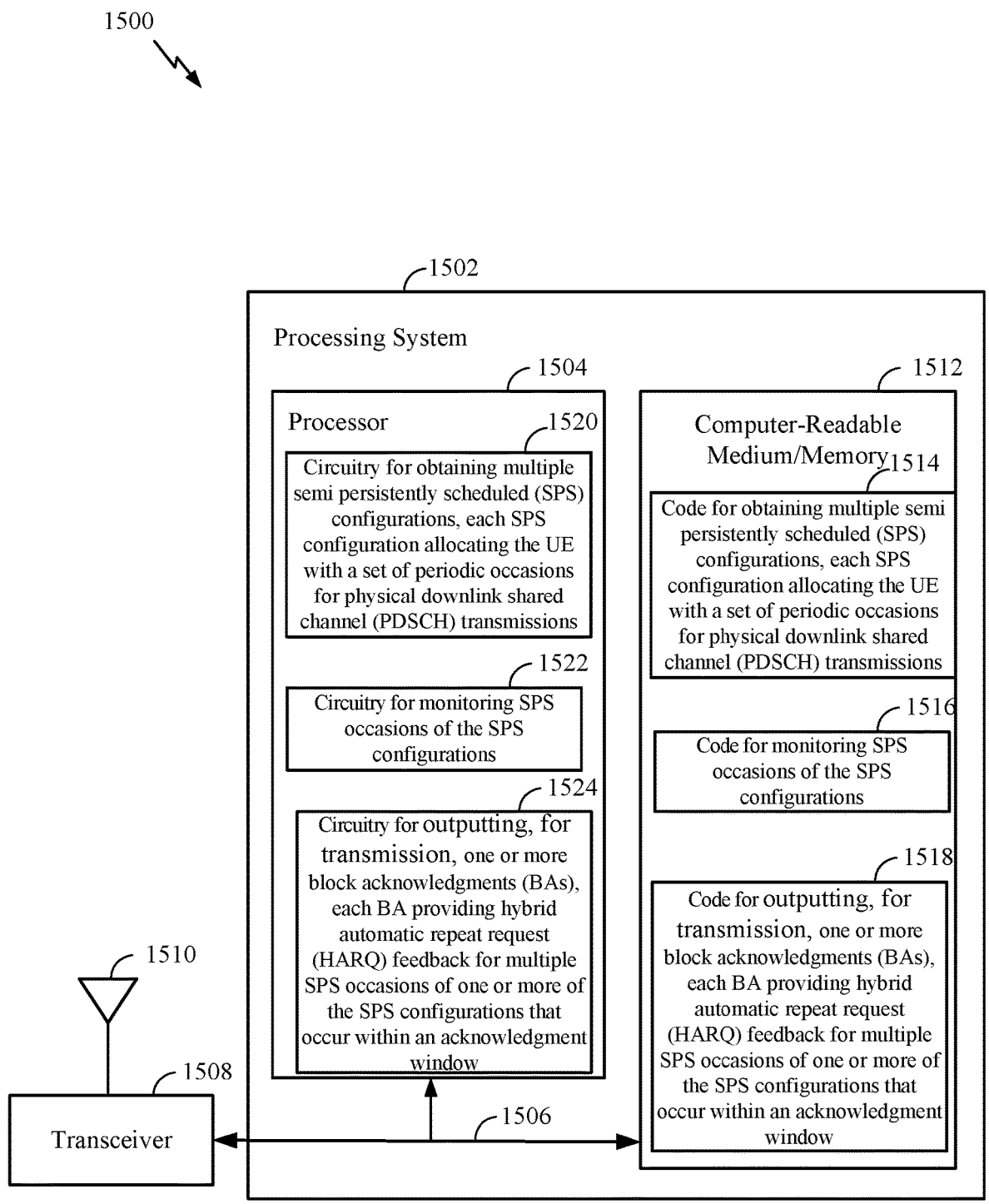
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 8. The communications device 1500 includes a processing system 1502 coupled to a transceiver 1508. The transceiver 1108 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 8, or other operations for performing the various techniques discussed herein. In certain aspects, computer-readable medium/memory 1512 stores code 1514 for receiving multiple semi persistently scheduled (SPS) configurations, each SPS configuration allocating the UE with a set of periodic occasions for physical downlink shared channel (PDSCH) transmissions; code 1516 for monitoring SPS occasions of the SPS configurations; and code 1518 for transmitting one or more block acknowledgments (BAs), each BA providing hybrid automatic repeat request (HARQ) feedback for multiple SPS occasions of one or more of the SPS configurations that occur within an acknowledgment window. In certain aspects, the processor 1504 has circuitry configured to implement the code stored in the computer-readable medium/memory 1512. The processor 1504 includes circuitry 1520 for receiving multiple semi persistently scheduled (SPS) configurations, each SPS configuration allocating the UE with a set of periodic occasions for physical downlink shared channel (PDSCH)

transmissions; circuitry 1522 for monitoring SPS occasions of the SPS configurations; and circuitry 1524 for transmitting one or more block acknowledgments (BAs), each BA providing hybrid automatic repeat request (HARQ) feedback for multiple SPS occasions of one or more of the SPS configurations that occur within an acknowledgment window.

Figure 16:
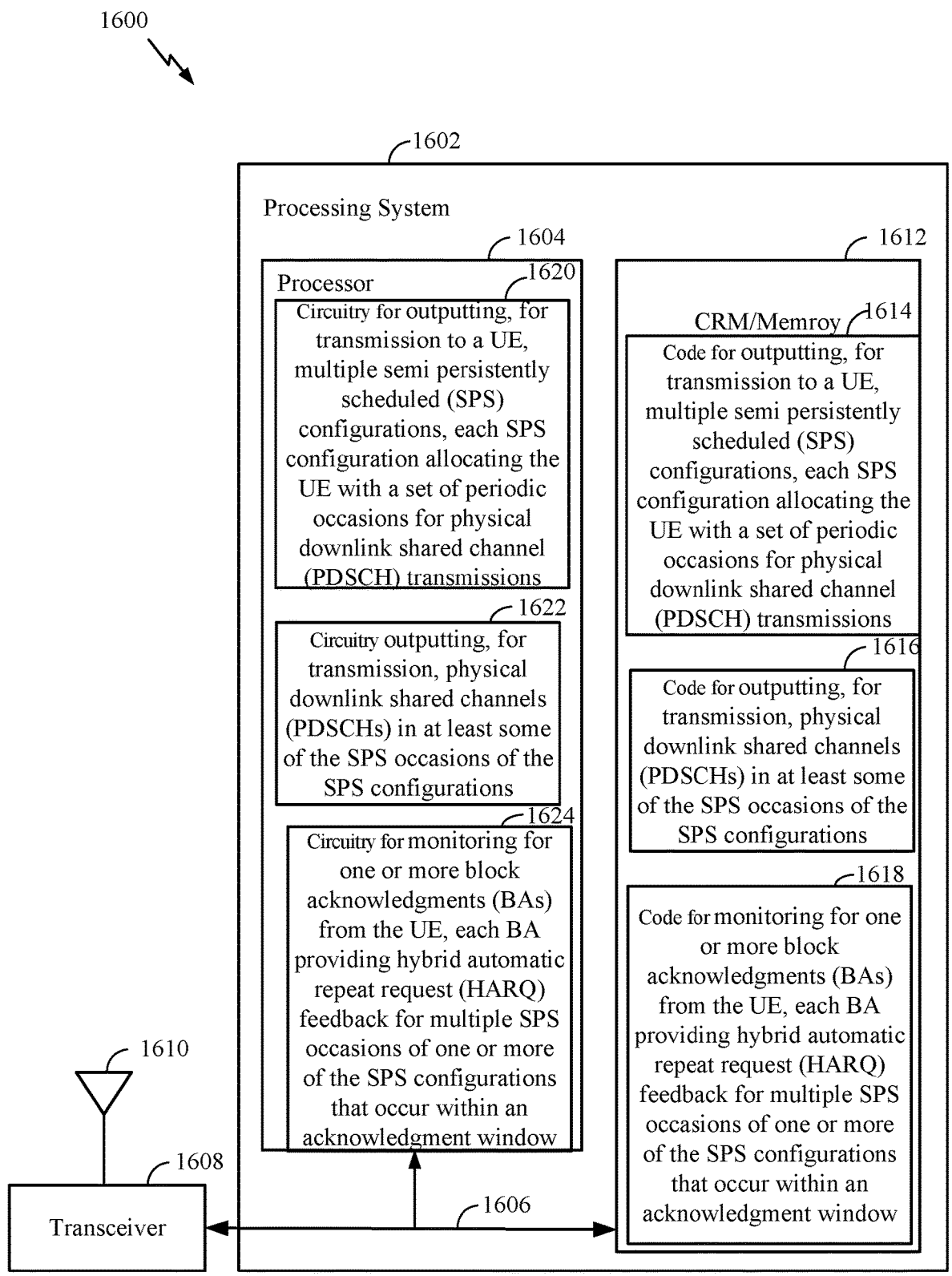
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 9. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1606. In certain aspects, the computer-readable medium/memory 1612 is configured to store instructions (e.g., computer-executable code) that when executed by the processor 1604, cause the processor 1604 to perform the operations illustrated in FIG. 9, or other operations for performing the various techniques discussed herein. In certain aspects, computer-readable medium/memory 1612 stores code 1614 for transmitting, to a user equipment (UE), multiple semi persistently scheduled (SPS) configurations, each SPS configuration allocating the UE with a set of periodic occasions for physical downlink shared channel (PDSCH) transmissions; code 1616 for transmitting physical downlink shared channels (PDSCHs) in at least some of the SPS occasions of the SPS configurations; and code 1618 for monitoring for one or more block acknowledgments (BAs) from the UE, each BA providing hybrid automatic repeat request (HARQ) feedback for multiple SPS occasions of one or more of the SPS configurations that occur within an acknowledgment window. In certain aspects, the processor 1204 has circuitry configured to implement the code stored in the computer-readable medium/memory 1612. The processor 1604 includes circuitry 1620 for transmitting, to a user equipment (UE), multiple semi persistently scheduled (SPS) configurations, each SPS configuration allocating the UE with a set of periodic occasions for physical downlink shared channel (PDSCH) transmissions; circuitry 1622 for transmitting physical downlink shared channels (PDSCHs) in at least some of the SPS occasions of the SPS configurations; and circuitry 1624 for monitoring for one or more block acknowledgments (BAs) from the UE, each BA providing hybrid automatic repeat request (HARQ) feedback for multiple SPS occasions of one or more of the SPS configurations that occur within an acknowledgment window.

In addition to the various aspects described above, aspects of specific combinations are within the scope of the disclosure, some of which are detailed below:

Aspect 1: A method for wireless communications by a user equipment (UE), comprising: receiving multiple semi persistently scheduled (SPS) configurations, each SPS configuration allocating the UE with a set of periodic occasions for physical downlink shared channel (PDSCH) transmissions; monitoring SPS occasions of the SPS configurations; and transmitting one or more block acknowledgments (BAs), each BA providing hybrid automatic repeat request (HARQ) feedback for multiple SPS occasions of one or more of the SPS configurations that occur within an acknowledgment window.

Aspect 2: The method of Aspect 1, wherein transmitting the one or more BAs comprises: transmitting separate BAs for each SPS configuration, each BA providing HARQ feedback for multiple SPS occasions for a corresponding SPS configuration.

Aspect 3: The method of any one of Aspects 1-2, wherein transmitting the one or more BAs comprises: transmitting at least one shared BA that provides HARQ feedback for SPS occasions of multiple SPS configurations.

Aspect 4: The method of Aspect 3, wherein, a number of SPS occasions acknowledged for each of the SPS configurations by the shared BA varies based on at least the number of SPS occasions for each of the SPS configurations with the acknowledgment window.

Aspect 5: The method of Aspect 4, wherein an ordering of acknowledgment feedback within the BA is based on at least one of: SPS configuration numbers of the SPS configurations that share the shared BA; or an order in which the SPS occasions acknowledged in the shared BA occur within the acknowledgment window.

Aspect 6: The method of Aspect 4, wherein: resources for the shared BA are allocated based on a maximum number of SPS occasions that occur in the acknowledgment window; and unused resources allocated to the shared BA are used to improve link efficiency of HARQ feedback provided in the shared BA.

Aspect 7: The method of any one of Aspects 3-4, wherein: the shared BAs are used to provide negative acknowledgments (NAKs) only; and the UE provides, with the shared BA, information identifying which SPS occasions are being negatively acknowledged.

Aspect 8: The method of Aspect 7, wherein the identifying information comprises at least one of a HARQ Process ID or an SPS configuration number.

Aspect 9: The method of Aspect 7, wherein, if overlapping HARQ Process IDs are allowed among SPS configurations, the identifying information also comprises an SPS configuration number.

Aspect 10: The method of Aspect 7, wherein payload sizes of the shared BAs are quantized to provide a fixed number of NAKs.

Aspect 11: The method of Aspect 7, wherein the identifying information further comprises unique identifiers corresponding to SPS occasions within the acknowledgment window.

Aspect 12: The method of Aspect 3, wherein the number of SPS occasions acknowledged for each of the SPS configurations by a shared BA is fixed.

Aspect 13: The method of Aspect 12, wherein: resources for the shared BA are allocated based on a maximum number of SPS occasions that occur in the acknowledgment window; and the UE indicates a negative acknowledgment (NAK) if a PDSCH transmission is not detected in a SPS occasion within the acknowledgment window.

Aspect 14: The method of any one of Aspects 1-13, further comprising receiving signaling indicating one or more features for transmitting the one or more BAs.

Aspect 15: The method of Aspect 14, wherein the one or more features comprise at least one of: whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window;

whether overlapping HARQ Process IDs are allowed among SPS configurations; whether the BAs carry positive acknowledgments (ACKs) and negative acknowledgments (NAKs) or only NAKs; or whether the number of SPS occasions acknowledged for each of the SPS configurations by a BA is fixed or variable.

Aspect 16: The method of any one of Aspects 14-15, wherein the signaling indicating the one or more features is received in response to a request from the UE.

Aspect 17: The method of Aspect 15, wherein the signaling is received with the SPS configurations.

Aspect 18: The method of any one of Aspects 14-15, wherein one or more of the features are activated or deactivated via at least one of: radio resource control (RRC), medium access control (MAC), or physical layer (PHY) signaling.

Aspect 19: The method of any one of Aspects 1-18, wherein physical uplink control channel (PUCCH) resources for transmitting the one or more BAs are assigned and configured with the SPS configurations.

Aspect 20: The method of any one of Aspects 1-19, wherein physical uplink control channel (PUCCH) resources for transmitting the one or more BAs are dynamically assigned.

Aspect 21: A method for wireless communications by a network entity, comprising: transmitting, to a user equipment (UE), multiple semi persistently scheduled (SPS) configurations, each SPS configuration allocating the UE with a set of periodic occasions for physical downlink shared channel (PDSCH) transmissions; transmitting physical downlink shared channels (PDSCHs) in at least some of the SPS occasions of the SPS configurations; and monitoring for one or more block acknowledgments (BAs) from the UE, each BA providing hybrid automatic repeat request (HARQ) feedback for multiple SPS occasions of one or more of the SPS configurations that occur within an acknowledgment window.

Aspect 22: The method of Aspect 21, wherein monitoring for the one or more BAs comprises: monitoring for separate BAs for each SPS configuration, each BA providing HARQ feedback for multiple SPS occasions for a corresponding SPS configuration.

Aspect 23: The method of any one of Aspects 21-22, wherein monitoring for the one or more BAs comprises: monitoring for at least one shared BA that provides HARQ feedback for SPS occasions of multiple SPS configurations.

Aspect 24: The method of Aspect 23, wherein, a number of SPS occasions acknowledged for each of the SPS configurations by the shared BA varies based on at least the number of SPS occasions for each of the SPS configurations with the acknowledgment window.

Aspect 25: The method of Aspect 24, wherein an ordering of acknowledgment feedback within the BA is based on at least one of: SPS configuration numbers of the SPS configurations that share the shared BA; or an order in which the SPS occasions acknowledged in the shared BA occur within the acknowledgment window.

Aspect 26: The method of Aspect 24, wherein: resources for the shared BA are allocated based on a maximum number of SPS occasions that occur in the acknowledgment window; and unused resources allocated to the shared BA are used to improve link efficiency of HARQ feedback provided in the shared BA.

Aspect 27: The method of any one of Aspects 23-24, wherein: the shared BAs are used to provide negative acknowledgments (NAKs) only; and the UE provides, with the shared BA, information identifying which SPS occasions are being negatively acknowledged.

Aspect 28: The method of Aspect 27, wherein the identifying information comprises at least one of a HARQ Process ID or an SPS configuration number.

Aspect 29: The method of Aspect 27, wherein, if overlapping HARQ Process IDs are allowed among SPS configurations, the identifying information comprises an SPS configuration number.

Aspect 30: The method of Aspect 27, wherein payload sizes of the shared BAs are quantized to provide a fixed number of NAKs.

Aspect 31: The method of Aspect 27, wherein the identifying information further comprises unique identifiers corresponding to SPS occasions within the acknowledgment window.

Aspect 32: The method of Aspect 23, wherein the number of SPS occasions acknowledged for each of the SPS configurations by a shared BA is fixed.

Aspect 33: The method of Aspect 32, wherein: resources for the shared BA are allocated based on a maximum number of SPS occasions that occur in the acknowledgment window; and the UE indicates a negative acknowledgment (NAK) if a PDSCH transmission is not detected in a SPS occasion within the acknowledgment window.

Aspect 34: The method of any one of Aspects 21-33, further comprising signaling the UE an indication of one or more features for transmitting the one or more BAs.

Aspect 35: The method of Aspect 34, wherein the one or more features comprise at least one of: whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window; whether overlapping HARQ Process IDs are allowed among SPS configurations; whether the BAs carry positive acknowledgments (ACKs) and negative acknowledgments (NAKs) or only NAKs; or whether the number of SPS occasions acknowledged for each of the SPS configurations by a BA is fixed or variable.

Aspect 36: The method of any one of Aspects 34-35, wherein the indication of the one or more features is signaled in response to a request from the UE.

Aspect 37: The method of Aspect 35, wherein the indication is signaled with the SPS configurations.

Aspect 38: The method of any one Aspects 34-35, further comprising activating or deactivating one or more of the features via at least one of: radio resource control (RRC), medium access control (MAC), or physical layer (PHY) signaling.

Aspect 39: The method of any one of Aspects 21-38, wherein physical uplink control channel (PUCCH) resources for transmitting the one or more BAs are assigned and configured with the SPS configurations.

Aspect 40: The method of any one of Aspects 21-39, wherein physical uplink control channel (PUCCH) resources for transmitting the one or more BAs are dynamically assigned.

Aspect 41: A user equipment (UE), comprising: means for receiving multiple semi persistently scheduled (SPS) configurations, each SPS configuration allocating the UE with a set of periodic occasions for physical downlink shared channel (PDSCH) transmissions; means for monitoring SPS occasions of the SPS configurations; and means for transmitting one or more block acknowledgments (BAs), each BA providing hybrid automatic repeat request (HARQ)

feedback for multiple SPS occasions of one or more of the SPS configurations that occur within an acknowledgment window.

Aspect 42: The UE of Aspect 41, wherein the means for transmitting the one or more BAs comprises: means for transmitting separate BAs for each SPS configuration, each BA providing HARQ feedback for multiple SPS occasions for a corresponding SPS configuration.

Aspect 43: The UE of any one of Aspects 41-42, wherein the means for transmitting the one or more BAs comprises: means for transmitting at least one shared BA that provides HARQ feedback for SPS occasions of multiple SPS configurations.

Aspect 44: The UE of Aspect 43, wherein, a number of SPS occasions acknowledged for each of the SPS configurations by the shared BA varies based on at least the number of SPS occasions for each of the SPS configurations with the acknowledgment window.

Aspect 45: The UE of Aspect 44, wherein an ordering of acknowledgment feedback within the BA is based on at least one of: SPS configuration numbers of the SPS configurations that share the shared BA; or an order in which the SPS occasions acknowledged in the shared BA occur within the acknowledgment window.

Aspect 46: The UE of Aspect 44, wherein: resources for the shared BA are allocated based on a maximum number of SPS occasions that occur in the acknowledgment window; and unused resources allocated to the shared BA are used to improve link efficiency of HARQ feedback provided in the shared BA.

Aspect 47: The UE of any one of Aspects 43-44, wherein: the shared BAs are used to provide negative acknowledgments (NAKs) only; and the means for transmitting further transmits, with the shared BA, information identifying which SPS occasions are being negatively acknowledged.

Aspect 48: The UE of Aspect 47, wherein the identifying information comprises at least one of a HARQ Process ID or an SPS configuration number.

Aspect 49: The UE of Aspect 47, wherein, if overlapping HARQ Process IDs are allowed among SPS configurations, the identifying information also comprises an SPS configuration number.

Aspect 50: The UE of Aspect 47, wherein payload sizes of the shared BAs are quantized to provide a fixed number of NAKs.

Aspect 51: The UE of Aspect 47, wherein the identifying information further comprises unique identifiers corresponding to SPS occasions within the acknowledgment window.

Aspect 52: The UE of Aspect 43, wherein the number of SPS occasions acknowledged for each of the SPS configurations by a shared BA is fixed.

Aspect 53: The UE of Aspect 52, wherein: resources for the shared BA are allocated based on a maximum number of SPS occasions that occur in the acknowledgment window; and the UE further comprising means for indicating a negative acknowledgment (NAK) if a PDSCH transmission is not detected in a SPS occasion within the acknowledgment window.

Aspect 54: The UE of Aspect 41, further comprising means for receiving signaling indicating one or more features for transmitting the one or more BAs.

Aspect 55: The UE of Aspect 54, wherein the one or more features comprise at least one of: whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window; whether overlapping HARQ Process IDs are allowed among SPS configurations; whether the BAs carry positive acknowledgments (ACKs) and negative acknowledgments (NAKs) or only NAKs; or whether the number of SPS occasions acknowledged for each of the SPS configurations by a BA is fixed or variable.

Aspect 56: The UE of any one of Aspects 54-55, wherein the signaling indicating the one or more features is received in response to a request from the UE.

Aspect 57: The UE of Aspect 55, wherein the signaling is received with the SPS configurations.

Aspect 58: The UE of any one of Aspects 54-55, wherein one or more of the features are activated or deactivated via at least one of: radio resource control (RRC), medium access control (MAC), or physical layer (PHY) signaling.

Aspect 59: The UE of any one of Aspects 41-58, wherein physical uplink control channel (PUCCH) resources for transmitting the one or more BAs are assigned and configured with the SPS configurations.

Aspect 60: The UE of any one of Aspects 41-59, wherein physical uplink control channel (PUCCH) resources for transmitting the one or more BAs are dynamically assigned.

Aspect 61: A network entity, comprising: means for transmitting, to a user equipment (UE), multiple semi persistently scheduled (SPS) configurations, each SPS configuration allocating the UE with a set of periodic occasions for physical downlink shared channel (PDSCH) transmissions; means for transmitting physical downlink shared channels (PDSCHs) in at least some of the SPS occasions of the SPS configurations; and means for monitoring for one or more block acknowledgments (BAs) from the UE, each BA providing hybrid automatic repeat request (HARQ) feedback for multiple SPS occasions of one or more of the SPS configurations that occur within an acknowledgment window.

Aspect 62: The network entity of Aspect 61, wherein the means for monitoring for the one or more BAs comprises: means for monitoring for separate BAs for each SPS configuration, each BA providing HARQ feedback for multiple SPS occasions for a corresponding SPS configuration.

Aspect 63: The network entity of any one of Aspects 61-62, wherein the means for monitoring for the one or more BAs comprises: means for monitoring for at least one shared BA that provides HARQ feedback for SPS occasions of multiple SPS configurations.

Aspect 64: The network entity of Aspect 63, wherein, a number of SPS occasions acknowledged for each of the SPS configurations by the shared BA varies based on at least the number of SPS occasions for each of the SPS configurations with the acknowledgment window.

Aspect 65: The network entity of Aspect 64, wherein an ordering of acknowledgment feedback within the BA is based on at least one of: SPS configuration numbers of the SPS configurations that share the shared BA; or an order in which the SPS occasions acknowledged in the shared BA occur within the acknowledgment window.

Aspect 66: The network entity of Aspect 64, wherein: resources for the shared BA are allocated based on a maximum number of SPS occasions that occur in the acknowledgment window; and unused resources allocated to the shared BA are used to improve link efficiency of HARQ feedback provided in the shared BA.

Aspect 67: The network entity any one of Aspects 63-64, wherein: the shared BAs are used to provide negative acknowledgments (NAKs) only; and the network entity further comprising means for receiving, with the shared BA, information identifying which SPS occasions are being negatively acknowledged.

Aspect 68: The network entity of Aspect 67, wherein the identifying information comprises at least one of a HARQ Process ID or an SPS configuration number.

Aspect 69: The network entity of Aspect 67, wherein, if overlapping HARQ Process IDs are allowed among SPS configurations, the identifying information comprises an SPS configuration number.

Aspect 70: The network entity of Aspect 67, wherein payload sizes of the shared BAs are quantized to provide a fixed number of NAKs.

Aspect 71: The network entity of Aspect 67, wherein the identifying information further comprises unique identifiers corresponding to SPS occasions within the acknowledgment window.

Aspect 72: The network entity of Aspect 63, wherein the number of SPS occasions acknowledged for each of the SPS configurations by a shared BA is fixed.

Aspect 73: The network entity of Aspect 72, wherein: resources for the shared BA are allocated based on a maximum number of SPS occasions that occur in the acknowledgment window; and the network entity further comprising means for receiving an indication of a negative acknowledgment (NAK) if a PDSCH transmission is not detected in a SPS occasion within the acknowledgment window.

Aspect 74: The network entity of any one of Aspects 61-73, further comprising means for signaling the UE an indication of one or more features for transmitting the one or more BAs.

Aspect 75: The network entity of Aspect 74, wherein the one or more features comprise at least one of: whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window; whether overlapping HARQ Process IDs are allowed among SPS configurations; whether the BAs carry positive acknowledgments (ACKs) and negative acknowledgments (NAKs) or only NAKs; or whether the number of SPS occasions acknowledged for each of the SPS configurations by a BA is fixed or variable.

Aspect 76: The network entity of any one of Aspects 74-75, wherein the indication of the one or more features is signaled in response to a request from the UE.

Aspect 77: The network entity of Aspect 75, wherein the indication is signaled with the SPS configurations.

Aspect 78: The network entity of any one of Aspects 74-75, further comprising means for activating or means for deactivating one or more of the features via at least one of: radio resource control (RRC), medium access control (MAC), or physical layer (PHY) signaling.

Aspect 79: The network entity of any one of Aspects 61-78, wherein physical uplink control channel (PUCCH) resources for transmitting the one or more BAs are assigned and configured with the SPS configurations.

Aspect 80: The network entity of any one of Aspects 61-79, wherein physical uplink control channel (PUCCH) resources for transmitting the one or more BAs are dynamically assigned.

Aspect 81: A user equipment (UE), comprising: a receiver configured to receive multiple semi persistently scheduled (SPS) configurations, each SPS configuration allocating the UE with a set of periodic occasions for physical downlink shared channel (PDSCH) transmissions; a processing system configured to monitor SPS occasions of the SPS configurations; and a transmitter configured to transmit one or more block acknowledgments (BAs), each BA providing hybrid automatic repeat request (HARQ) feedback for multiple SPS occasions of one or more of the SPS configurations that occur within an acknowledgment window.

Aspect 82: The UE of Aspect 81, wherein the transmission of the one or more BAs comprises: transmitting separate BAs for each SPS configuration, each BA providing HARQ feedback for multiple SPS occasions for a corresponding SPS configuration.

Aspect 83: The UE of any one of Aspects 81-82, wherein the transmission of the one or more BAs comprises: transmitting at least one shared BA that provides HARQ feedback for SPS occasions of multiple SPS configurations.

Aspect 84: The UE of Aspect 83, wherein, a number of SPS occasions acknowledged for each of the SPS configurations by the shared BA varies based on at least the number of SPS occasions for each of the SPS configurations with the acknowledgment window.

Aspect 85: The UE of Aspect 84, wherein an ordering of acknowledgment feedback within the BA is based on at least one of: SPS configuration numbers of the SPS configurations that share the shared BA; or an order in which the SPS occasions acknowledged in the shared BA occur within the acknowledgment window.

Aspect 86: The UE of Aspect 84, wherein: resources for the shared BA are allocated based on a maximum number of SPS occasions that occur in the acknowledgment window; and unused resources allocated to the shared BA are used to improve link efficiency of HARQ feedback provided in the shared BA.

Aspect 87: The UE of any one of Aspects 83-84, wherein: the shared BAs are used to provide negative acknowledgments (NAKs) only; and the processing system is further configured to provide, with the shared BA, information identifying which SPS occasions are being negatively acknowledged.

Aspect 88: The UE of Aspect 87, wherein the identifying information comprises at least one of a HARQ Process ID or an SPS configuration number.

Aspect 89: The UE of Aspect 87, wherein, if overlapping HARQ Process IDs are allowed among SPS configurations, the identifying information also comprises an SPS configuration number.

Aspect 90: The UE of Aspect 87, wherein payload sizes of the shared BAs are quantized to provide a fixed number of NAKs.

Aspect 91: The UE of Aspect 87, wherein the identifying information further comprises unique identifiers corresponding to SPS occasions within the acknowledgment window.

Aspect 92: The UE of Aspect 83, wherein the number of SPS occasions acknowledged for each of the SPS configurations by a shared BA is fixed.

Aspect 93: The UE of Aspect 92, wherein: resources for the shared BA are allocated based on a maximum number of SPS occasions that occur in the acknowledgment window; and the processing system is further configured to indicate a negative acknowledgment (NAK) if a PDSCH transmission is not detected in a SPS occasion within the acknowledgment window.

Aspect 94: The UE of any one of Aspects 81-93, wherein the receiver is further configured to receive signaling indicating one or more features for transmitting the one or more BAs.

Aspect 95: The UE of Aspect 94, wherein the one or more features comprise at least one of: whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window; whether overlapping HARQ Process IDs are allowed among SPS configurations; whether the BAs carry positive acknowledgments (ACKs) and negative acknowledgments (NAKs) or only NAKs; or whether the number of SPS occasions acknowledged for each of the SPS configurations by a BA is fixed or variable.

Aspect 96: The UE of any one of Aspects 94-95, wherein the signaling indicating the one or more features is received in response to a request from the UE.

Aspect 97: The UE of Aspect 95, wherein the signaling is received with the SPS configurations.

Aspect 98: The UE of any one of Aspects 94-95, wherein one or more of the features are activated or deactivated via at least one of: radio resource control (RRC), medium access control (MAC), or physical layer (PHY) signaling.

Aspect 99: The UE of any one of Aspects 81-98, wherein physical uplink control channel (PUCCH) resources for transmitting the one or more BAs are assigned and configured with the SPS configurations.

Aspect 100: The UE of any one of Aspects 81-99, wherein physical uplink control channel (PUCCH) resources for transmitting the one or more BAs are dynamically assigned.

Aspect 101: A network entity, comprising: a transmitter configured to transmit, to a user equipment (UE), multiple semi persistently scheduled (SPS) configurations, each SPS configuration allocating the UE with a set of periodic occasions for physical downlink shared channel (PDSCH) transmissions and transmit physical downlink shared channels (PDSCHs) in at least some of the SPS occasions of the SPS configurations; and a processing system configured to monitor for one or more block acknowledgments (BAs) from the UE, each BA providing hybrid automatic repeat request (HARQ) feedback for multiple SPS occasions of one or more of the SPS configurations that occur within an acknowledgment window.

Aspect 102: The network entity of Aspect 101, wherein the processing system monitor for the one or more BAs by monitoring for separate BAs for each SPS configuration, each BA providing HARQ feedback for multiple SPS occasions for a corresponding SPS configuration.

Aspect 103: The network entity of any one of Aspects 101-102, wherein the processing system monitors for the one or more BAs by: monitoring for at least one shared BA that provides HARQ feedback for SPS occasions of multiple SPS configurations.

Aspect 104: The network entity of Aspect 103, wherein, a number of SPS occasions acknowledged for each of the SPS configurations by the shared BA varies based on at least the number of SPS occasions for each of the SPS configurations with the acknowledgment window.

Aspect 105: The network entity of Aspect 104, wherein an ordering of acknowledgment feedback within the BA is based on at least one of: SPS configuration numbers of the SPS configurations that share the shared BA; or an order in which the SPS occasions acknowledged in the shared BA occur within the acknowledgment window.

Aspect 106: The network entity of Aspect 104, wherein: resources for the shared BA are allocated based on a maximum number of SPS occasions that occur in the acknowledgment window; and unused resources allocated to the shared BA are used to improve link efficiency of HARQ feedback provided in the shared BA.

Aspect 107: The network entity any one of Aspects 103-104, wherein: the shared BAs are used to provide negative acknowledgments (NAKs) only; and the network entity further comprising a receiver configured to receive, with the shared BA, information identifying which SPS occasions are being negatively acknowledged.

Aspect 108: The network entity of Aspect 107, wherein the identifying information comprises at least one of a HARQ Process ID or an SPS configuration number.

Aspect 109: The network entity of Aspect 107, wherein, if overlapping HARQ Process IDs are allowed among SPS configurations, the identifying information comprises an SPS configuration number.

Aspect 110: The network entity of Aspect 107, wherein payload sizes of the shared BAs are quantized to provide a fixed number of NAKs.

Aspect 111: The network entity of Aspect 107, wherein the identifying information further comprises unique identifiers corresponding to SPS occasions within the acknowledgment window.

Aspect 112: The network entity of Aspect 103, wherein the number of SPS occasions acknowledged for each of the SPS configurations by a shared BA is fixed.

Aspect 113: The network entity of Aspect 112, wherein: resources for the shared BA are allocated based on a maximum number of SPS occasions that occur in the acknowledgment window; and the network entity further comprising a receiver configured to receive a negative acknowledgment (NAK) if a PDSCH transmission is not detected in a SPS occasion within the acknowledgment window.

Aspect 114: The network entity of any one of Aspects 101-113, wherein the processing system is further configured to provide signaling of, for transmission to the UE, an indication of one or more features for transmitting the BAs.

Aspect 115: The network entity of Aspect 114, wherein the one or more features comprise at least one of: whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window; whether overlapping HARQ Process IDs are allowed among SPS configurations; whether the BAs carry positive acknowledgments (ACKs) and negative acknowledgments (NAKs) or only NAKs; or whether the number of SPS occasions acknowledged for each of the SPS configurations by a BA is fixed or variable.

Aspect 116: The network entity of any one of Aspects 114-115, wherein the indication of the one or more features is signaled in response to a request from the UE.

Aspect 117: The network entity of Aspect 115, wherein the indication is signaled with the SPS configurations.

Aspect 118: The network entity of any one of Aspects 114-115, wherein the processing system is further configured to activate or deactivate one or more of the features via at least one of: radio resource control (RRC), medium access control (MAC), or physical layer (PHY) signaling.

Aspect 119: The network entity of any one of Aspects 101-118, wherein physical uplink control channel (PUCCH) resources for transmitting the BAs are assigned and configured with the SPS configurations.

Aspect 120: The network entity of any one of Aspects 101-119, wherein physical uplink control channel (PUCCH) resources for transmitting the BAs are dynamically assigned.

Aspect 121: An apparatus for wireless communications by a user equipment (UE), comprising: an interface configured to receive multiple semi persistently scheduled (SPS) configurations, each SPS configuration allocating the UE with a set of periodic occasions for physical downlink shared channel (PDSCH) transmissions; and a processing system configured to monitor SPS occasions of the SPS configurations, and generate one or more block acknowledgments (BAs), each BA providing hybrid automatic repeat request (HARQ) feedback for multiple SPS occasions of one or more of the SPS configurations that occur within an acknowledgment window, wherein the interface is further configured to output the one or more BAs for transmission.

Aspect 122: An apparatus for wireless communications by a network entity, comprising: an interface configured to output, for transmission to a user equipment (UE), multiple semi persistently scheduled (SPS) configurations, each SPS configuration allocating the UE with a set of periodic occasions for physical downlink shared channel (PDSCH) transmissions, and output physical downlink shared channels (PDSCHs), for transmission, in at least some of the SPS occasions of the SPS configurations; and a processing system configured to monitor for one or more block acknowledgments (BAs) from the UE, each BA providing hybrid automatic repeat request (HARQ) feedback for multiple SPS occasions of one or more of the SPS configurations that occur within an acknowledgment window.

Aspect 123: A computer-readable medium for wireless communications by a user equipment (UE), comprising instructions executable to: receive multiple semi persistently scheduled (SPS) configurations, each SPS configuration allocating the UE with a set of periodic occasions for physical downlink shared channel (PDSCH) transmissions; monitor SPS occasions of the SPS configurations; and transmit one or more block acknowledgments (BAs), each BA providing hybrid automatic repeat request (HARQ) feedback for multiple SPS occasions of one or more of the SPS configurations that occur within an acknowledgment window.

Aspect 124: A computer-readable medium for wireless communications by a network entity, comprising instructions executable to: transmit, to a user equipment (UE), multiple semi persistently scheduled (SPS) configurations, each SPS configuration allocating the UE with a set of periodic occasions for physical downlink shared channel (PDSCH) transmissions; transmit physical downlink shared channels (PDSCHs) in at least some of the SPS occasions of the SPS configurations; and monitor for one or more block acknowledgments (BAs) from the UE, each BA providing hybrid automatic repeat request (HARQ) feedback for multiple SPS occasions of one or more of the SPS configurations that occur within an acknowledgment window.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, processors 458, 464, 466, and/or controller/processor 480 of the UE 120 and/or processors 420, 430, 438, and/or controller/processor 440 of the BS 110 shown in FIG. 4 may be configured to perform operations 800 of FIG. 8 and operations 900 of FIG. 9.

Means for receiving may include a receiver such as one or more antennas and/or receive processors illustrated in FIG. 4. Likewise, means for transmitting may include a transmitter such as one or more antennas and/or transmit processors illustrated in FIG. 4. Means for monitoring, means for indicating, means for signaling, means for activating, and means for deactivating may include a processing system, which may include one or more processors, such as processors 458, 464, 466, and/or controller/processor 480 of the UE 120 and/or processors 420, 430, 438, and/or controller/processor 440 of the BS 110 shown in FIG. 4.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving multiple semi persistently scheduled (SPS) configurations, each SPS configuration allocating the UE with a set of periodic SPS occasions for physical downlink shared channel (PDSCH) transmissions;
   monitoring the SPS occasions of the SPS configurations;
   transmitting one or more block acknowledgments (BAs), each BA providing hybrid automatic repeat request (HARQ) feedback for multiple SPS occasions of one or more of the SPS configurations that occur within an acknowledgment window, wherein:
      the one or more BAs include at least one shared BA that provides HARQ feedback for SPS occasions of multiple SPS configurations;
      the at least one shared BA is used to provide negative acknowledgments (NAKs) only; and
      resources for the at least one shared BA are allocated based on a maximum number of SPS occasions that occur in the acknowledgment window; and
   transmitting, with the at least one shared BA, information identifying which SPS occasions are being negatively acknowledged, the information comprising unique identifiers (IDs) corresponding to each of the SPS occasions being negatively acknowledged.

2. The method of claim 1, wherein an ordering of the HARQ feedback within the at least one shared BA is based on at least one of:
   SPS configuration numbers of the SPS configurations that share the at least one shared BA; or
   an order in which the SPS occasions acknowledged in the at least one shared BA occur within the acknowledgment window.

3. The method of claim 1, wherein:
   unused resources allocated to the at least one shared BA are used to improve link efficiency of the HARQ feedback provided in the at least one shared BA.

4. The method of claim 1, wherein the information further comprises at least one of a HARQ Process ID or an SPS configuration number.

5. The method of claim 1, wherein, when overlapping HARQ Process IDs are allowed among SPS configurations, the information comprises an SPS configuration number.

6. The method of claim 1, wherein a payload size of the at least one shared BA is quantized to provide a fixed number of NAKs.

7. The method of claim 1, wherein a number of SPS occasions acknowledged for each of the SPS configurations by the at least one shared BA is fixed.

8. The method of claim 1, further comprising receiving signaling indicating one or more features for transmitting the one or more BAs.

9. The method of claim 8, wherein the one or more features comprise at least one of:
   whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window; or
   whether overlapping HARQ Process IDs are allowed among SPS configurations.

10. A method for wireless communications by a network entity, comprising:
    transmitting, to a user equipment (UE), multiple semi persistently scheduled (SPS) configurations, each SPS configuration allocating the UE with a set of periodic SPS occasions for physical downlink shared channel (PDSCH) transmissions;
    transmitting PDSCHs in at least some of the SPS occasions of the SPS configurations;
    monitoring for one or more block acknowledgments (BAs) from the UE, each BA providing hybrid automatic repeat request (HARQ) feedback for multiple SPS occasions of one or more of the SPS configurations that occur within an acknowledgment window; and
    in response to the monitoring:
       receiving the one or more BAs from the UE, wherein:
          the one or more BAs include at least one shared BA that provides HARQ feedback for SPS occasions of multiple SPS configurations;
          the at least one shared BA is used to provide negative acknowledgments (NAKs) only; and
          resources for the at least one shared BA are allocated based on a maximum number of SPS occasions that occur in the acknowledgment window; and
       receiving, with the at least one shared BA, information identifying which SPS occasions are being negatively acknowledged, the information comprising unique identifiers (IDs) corresponding to each of the SPS occasions being negatively acknowledged.

11. The method of claim 10, wherein an ordering of the HARQ feedback within the at least one shared BA is based on at least one of:
    SPS configuration numbers of the SPS configurations that share the at least one shared BA; or
    an order in which the SPS occasions acknowledged in the at least one shared BA occur within the acknowledgment window.

12. The method of claim 10, wherein:
    unused resources allocated to the at least one shared BA are used to improve link efficiency of the HARQ feedback provided in the at least one shared BA.

13. The method of claim 10, wherein the information comprises at least one of a HARQ Process ID or an SPS configuration number.

14. The method of claim 10, wherein, when overlapping HARQ Process IDs are allowed among SPS configurations, the information comprises an SPS configuration number.

15. The method of claim 10, wherein a payload size of the at least one shared BA is quantized to provide a fixed number of NAKs.

16. The method of claim 10, wherein a number of SPS occasions acknowledged for each of the SPS configurations by the at least one shared BA is fixed.

17. The method of claim 10, further comprising signaling the UE an indication of one or more features for transmitting the one or more BAs.

18. The method of claim 17, wherein the one or more features comprise at least one of:
- whether the UE is to transmit separate BAs for each SPS configuration, each BA providing HARQ feedback for multiple SPS occasions for a corresponding SPS configuration or transmit shared BAs that provide HARQ feedback for SPS occasions of multiple SPS configurations within an acknowledgment window; or
- whether overlapping HARQ Process IDs are allowed among SPS configurations.

19. A user equipment (UE) configured for wireless communications, comprising:
- a memory comprising computer-executable instructions; and
- one or more processors, individually or collectively, configured to execute the computer-executable instructions and cause the UE to:
  - receive multiple semi persistently scheduled (SPS) configurations, each SPS configuration allocating the UE with a set of periodic SPS occasions for physical downlink shared channel (PDSCH) transmissions;
  - monitor the SPS occasions of the SPS configurations;
  - transmit one or more block acknowledgments (BAs), each BA providing hybrid automatic repeat request (HARQ) feedback for multiple SPS occasions of one or more of the SPS configurations that occur within an acknowledgment window, wherein:
    - the one or more BAs include at least one shared BA that provides HARQ feedback for SPS occasions of multiple SPS configurations;
    - the at least one shared BA is used to provide negative acknowledgments (NAKs) only; and
    - resources for the at least one shared BA are allocated based on a maximum number of SPS occasions that occur in the acknowledgment window; and
  - transmit, with the at least one shared BA, information identifying which SPS occasions are being negatively acknowledged, the information comprising unique identifiers (IDs) corresponding to each of the SPS occasions being negatively acknowledged.

20. A network entity configured for wireless communications, comprising:
- a memory comprising computer-executable instructions; and
- one or more processors, individually or collectively, configured to execute the computer-executable instructions and cause the network entity to:
  - transmit, to a user equipment (UE), multiple semi persistently scheduled (SPS) configurations, each SPS configuration allocating the UE with a set of periodic SPS occasions for physical downlink shared channel (PDSCH) transmissions;
  - transmit PDSCHs in at least some of the SPS occasions of the SPS configurations;
  - monitor for one or more block acknowledgments (BAs) from the UE, each BA providing hybrid automatic repeat request (HARQ) feedback for multiple SPS occasions of one or more of the SPS configurations that occur within an acknowledgment window; and
  - in response to the monitoring:
    - receive the one or more BAs from the UE, wherein:
      - the one or more BAs include at least one shared BA that provides HARQ feedback for SPS occasions of multiple SPS configurations;
      - the at least one shared BA is used to provide negative acknowledgments (NAKs) only; and
      - resources for the at least one shared BA are allocated based on a maximum number of SPS occasions that occur in the acknowledgment window; and
    - receive, with the at least one shared BA, information identifying which SPS occasions are being negatively acknowledged, the information comprising unique identifiers (IDs) corresponding to each of the SPS occasions being negatively acknowledged.

\* \* \* \* \*